United States Patent
Kuppelur et al.

(10) Patent No.: US 11,044,786 B2
(45) Date of Patent: Jun. 22, 2021

(54) HANDLING OF TIMER EXPIRY FOR MT CSFB

(71) Applicant: APPLE INC., Cupertino, CA (US)

(72) Inventors: Nitin Kuppelur, Bangalore (IN); Deepak Dash, Khordha (IN); Robert Zaus, Munich (DE); Roland Gruber, Sauerlach (DE)

(73) Assignee: APPLE INC., Cupertino, CA (US)

( * ) Notice: Subject to any disclaimer, the term of this patent is extended or adjusted under 35 U.S.C. 154(b) by 2 days.

(21) Appl. No.: 16/489,222

(22) PCT Filed: Jun. 27, 2018

(86) PCT No.: PCT/US2018/039800
§ 371 (c)(1),
(2) Date: Aug. 27, 2019

(87) PCT Pub. No.: WO2019/005996
PCT Pub. Date: Jan. 3, 2019

(65) Prior Publication Data
US 2020/0008269 A1 Jan. 2, 2020

Related U.S. Application Data

(60) Provisional application No. 62/526,868, filed on Jun. 29, 2017.

(51) Int. Cl.
*H04W 88/02* (2009.01)
*H04W 76/25* (2018.01)
(Continued)

(52) U.S. Cl.
CPC ......... *H04W 88/023* (2013.01); *H04W 4/029* (2018.02); *H04W 8/06* (2013.01);
(Continued)

(58) Field of Classification Search
CPC ............ H04W 36/0022; H04W 4/029; H04W 68/005; H04W 76/10; H04W 76/25;
(Continued)

(56) References Cited

U.S. PATENT DOCUMENTS

| 2011/0103277 A1* | 5/2011 | Watfa ................ H04W 36/0033 370/310 |
| 2012/0002545 A1* | 1/2012 | Watfa ................ H04W 36/0022 370/235 |

(Continued)

OTHER PUBLICATIONS

3GPP TS 24.301, "3rd Generation Partnership Project; Technical Specification Group Core Network and Terminals; Non-Access-Stratum (NAS) protocol for Evolved Packet System (EPS); Stage 3 (Release 14)", V14.4.0, Jun. 2017, 486 page.

(Continued)

*Primary Examiner* — Kashif Siddiqui
(74) *Attorney, Agent, or Firm* — Stoel Rives LLP

(57) ABSTRACT

Apparatuses and computer-readable storage media for handling timers for mobile terminated circuit-switched fallback (MT CSFB) calls. An apparatus for a user equipment (UE) includes processing circuitry operably coupled to a data storage device. The data storage device is configured to store a value of an extended service request for mobile terminated services (EXT-MT) timer. The value of the EXT-MT timer is less than a value of a guard timer of a Visitor Location Register (VLR). The processing circuitry is configured to start the EXT-MT timer and generate an extended service request message to be transmitted to a Mobility Management Entity (MME) responsive to a paging for an MT CSFB call, and attempt to select a radio access technology of a different type of network if the EXT-MT timer expires before the UE successfully performs inter system change and a circuit switched fallback cancellation request was not received from a subscriber.

24 Claims, 12 Drawing Sheets

(51) Int. Cl.
  *H04W 4/029* (2018.01)
  *H04W 76/38* (2018.01)
  *H04W 8/06* (2009.01)
  *H04W 8/08* (2009.01)
  *H04W 8/24* (2009.01)
  *H04W 68/00* (2009.01)
(52) U.S. Cl.
  CPC ............... *H04W 8/08* (2013.01); *H04W 8/24* (2013.01); *H04W 68/005* (2013.01); *H04W 76/25* (2018.02); *H04W 76/38* (2018.02)
(58) Field of Classification Search
  CPC ... H04W 76/38; H04W 88/023; H04W 88/06; H04W 88/14; H04W 8/06; H04W 8/08; H04W 8/24
  See application file for complete search history.

(56) References Cited

U.S. PATENT DOCUMENTS

| | | | | |
|---|---|---|---|---|
| 2012/0069731 | A1* | 3/2012 | Tooher | H04W 76/16 370/221 |
| 2012/0182912 | A1* | 7/2012 | Watfa | H04W 36/125 370/311 |
| 2012/0302239 | A1* | 11/2012 | Hu | H04W 36/0022 455/436 |
| 2013/0107863 | A1* | 5/2013 | Faccin | H04W 28/085 370/331 |
| 2014/0293960 | A1* | 10/2014 | Su | H04L 69/28 370/331 |
| 2014/0349662 | A1* | 11/2014 | Ekici | H04W 76/16 455/450 |
| 2015/0056993 | A1 | 2/2015 | Zhu et al. | |
| 2016/0066218 | A1 | 3/2016 | Basavarajappa et al. | |
| 2016/0080982 | A1* | 3/2016 | Bovo | H04L 41/5009 370/252 |
| 2016/0100336 | A1* | 4/2016 | Basavarajappa | H04W 48/18 370/331 |
| 2016/0127884 | A1 | 5/2016 | Kim et al. | |
| 2017/0359757 | A1* | 12/2017 | Lee | H04W 36/0022 |

OTHER PUBLICATIONS

3GPP TS 29.118, "3rd Generation Partnership Project; Technical Specification Group Core Network and Terminals; Mobility Management Entity (MME)—Visitor Location Register (VLR) SGs interface specification (Release 12)", V12.7.0, Dec. 2014, 74 pages.
Intel, "Handling of timer expiry during extended service request procedure for MT CSFB", C1-173591 (rev of C1-172980), 3GPP TSG-CT WG1 Meeting #105, Krakow, Poland, Change Request Current Version 14.4.0, Aug. 21-25, 2017, 26 pages.
Intel, "Handling of timer expiry during extended service request procedure for MT CSFB", C1-172979, 3GPP TSG CT WG1 Meeting #105, Krakow (Poland), Agenda Item 15.2.7.2, Aug. 21-25, 2017, 4 pages.
Intel, "Handling of timer expiry during extended service request procedure for MT CSFB", C1-172981, 3GPP TSG-CT WG1 Meeting #105, Krakow, Poland, Change Request Version 14.1.0, Aug. 21-25, 2017, 4 pages.
PCT/US2018/039800, International Search Report and Written Opinion, dated Sep. 21, 2018, 18 pages.

* cited by examiner

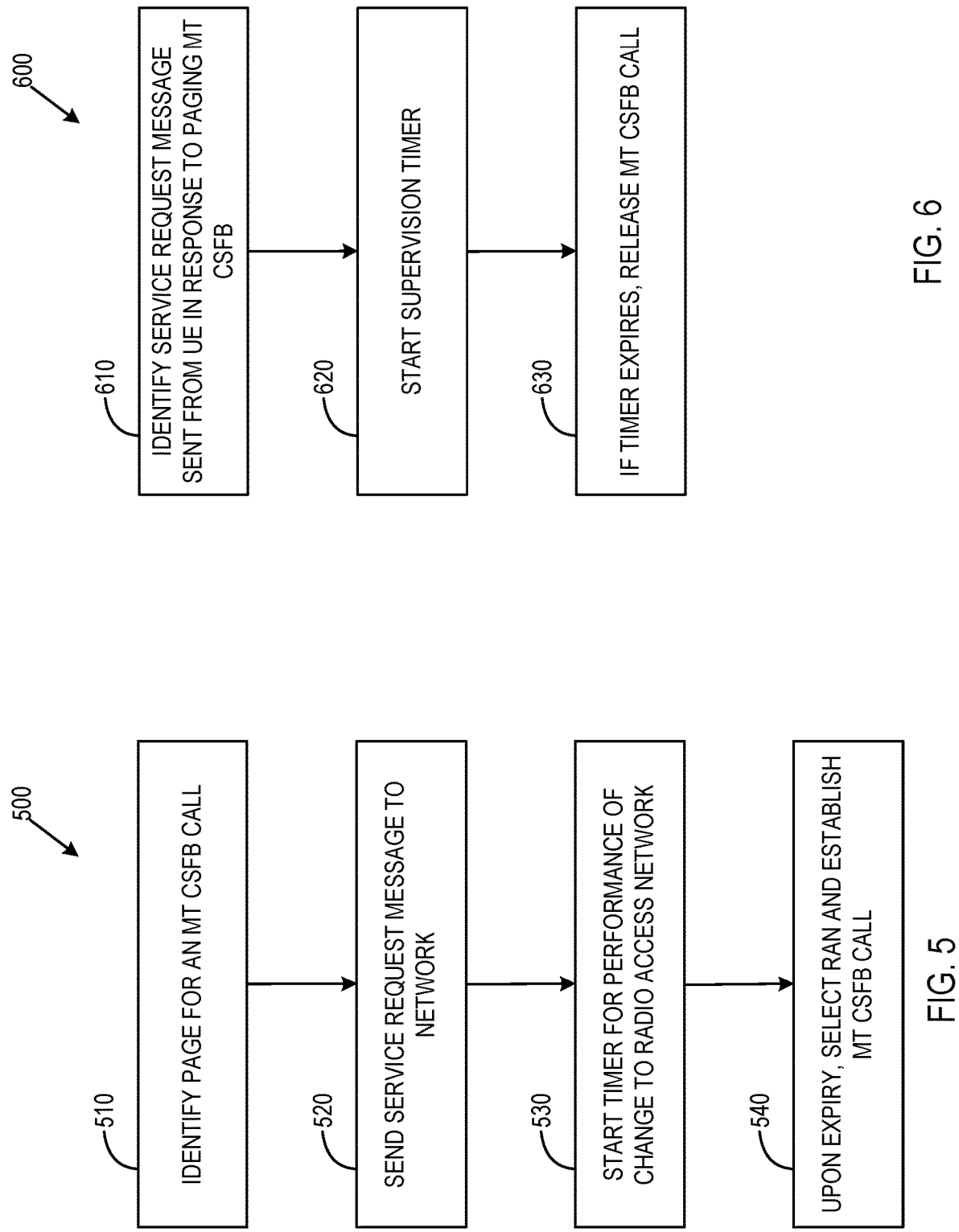

HANDLING OF TIMER EXPIRY FOR MT CSFB

RELATED APPLICATIONS

This application is a non-provisional of U.S. Provisional Patent Application No. 62/526,868, filed Jun. 29, 2017, which is incorporated by reference herein in its entirety.

BACKGROUND

Various embodiments generally may relate to the field of wireless communications.

BRIEF DESCRIPTION OF THE DRAWINGS

FIG. 1A is a simplified signal flow diagram of a failing establishment of a MT CSFB call in a system having a timer value at an MSC/VLR that is greater than a timer value at a UE.

FIG. 1B is a simplified signal flow diagram of a failing establishment of a MT CSFB call in a system having a timer value at the MSC/VLR that is less than a timer value at the UE.

FIG. 5 is a simplified flowchart illustrating a method of operating a user equipment (UE) in a wireless communication system, according to some embodiments.

FIG. 6 is a simplified flowchart illustrating a method of operating a Mobile Switching Centre (MSC)/Visitor Location Register (VLR) in a wireless communication system, according to some embodiments.

DETAILED DESCRIPTION

Figure 1A:
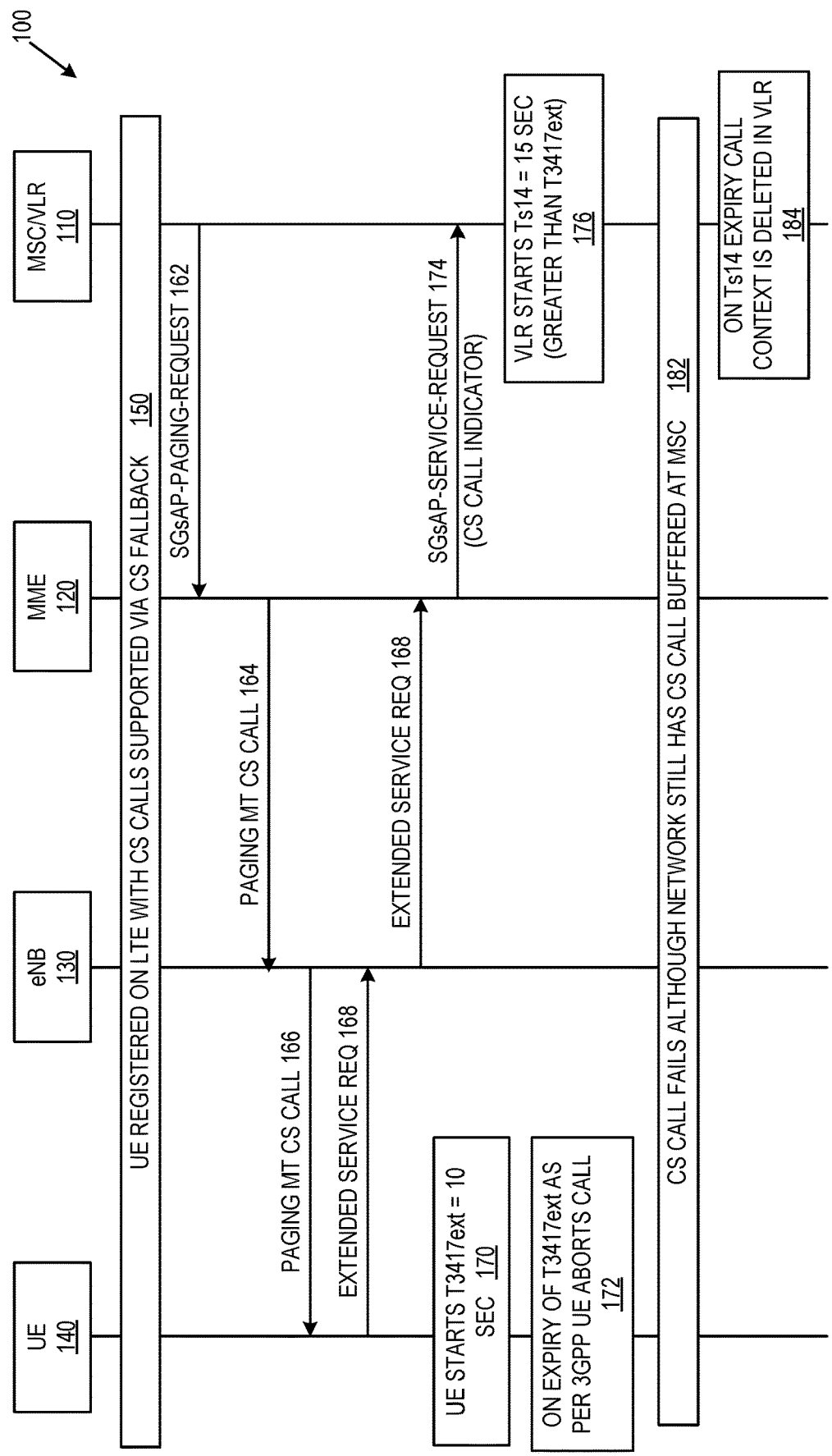
FIGS. 1A and 1B are simplified signal flow diagrams of establishment of a mobile terminating (MT) circuit-switched (CS) fallback (FB) call in a wireless communication system.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In cellular data communications systems, when circuit-switched (CS) fallback is used for supporting CS calls when the user equipment (UE) is camping on Long Term Evolution (LTE), for mobile-originating (MO) and mobile-terminating (MT) CS calls the UE sends an EXTENDED SERVICE REQUEST message and waits for the network to redirect or handover the UE to Global System for Mobile communications/Enhanced Data Rates for GSM Evolution (GSM/EDGE) Radio Access Network (RAN) (GERAN) or Universal Terrestrial Radio Access Network (UTRAN) to continue the call setup. To guard the response from the network for redirection or handover, the UE will start a timer (e.g., T3417ext). In various implementations, upon expiry of the timer, for the MO CS call the UE will attempt to select GERAN or UTRAN radio access technology and continue with the CS call setup. For MT CS calls, however, the Mobile Switching Centre (MSC)/Visitor Location Register (VLR) will buffer the MT call only for a limited time. As the T3417ext timer may be a ten second (10 sec) timer, by the time timer T3417ext expires the call could already be released at the network side. Hence, for MT calls the UE may not attempt to select GERAN or UTRAN radio access technology after expiration of the T3417ext timer, but may instead remain in LTE and consider the MT CSFB as failed. In practice this may cause unnecessary call drops for MT CS fallback calls. Success rate for these calls may be unnecessarily reduced as a result.

The Third Generation Partnership Project (3GPP) regulates the use of some cellular data communications systems. All references herein to the standards of the 3GPP are directed to Release 13, version 13.6.0. For example, 3GPP 24.301, section 5.6.1.6(d) recites, in part, as follows:

d) T3417ext expired

If the UE triggered service request procedure for mobile originated CS fallback or for mobile originated CS fallback for emergency call and a CS fallback cancellation request was not received, the UE shall attempt to select GERAN or UTRAN radio access technology. If the UE finds a suitable GERAN or UTRAN cell, it then proceeds with the appropriate MM and CC specific procedures and the EMM sublayer shall not indicate the abort of the service request procedure to the MM sublayer. Otherwise, the EMM sublayer shall indicate the abort of the service request procedure to the MM sublayer, and the UE shall also set the EPS update status to EU2 NOT UPDATED and enter the state EMM-REGISTERED.ATTEMPTING-TO-UPDATE.

If the service request was initiated for CS fallback and a CS fallback cancellation request was received the UE shall set the EPS update status to EU2 NOT UPDATED and enter the state EMM-REGISTERED.ATTEMPTING-TO-UPDATE.

If the UE triggered service request procedure for mobile terminated CS fallback, the UE shall enter the state EMM-REGISTERED;
  if the UE triggered service request procedure from EMM-IDLE mode, then the EMM sublayer shall abort the procedure, indicate to the MM sublayer that the CS fallback procedure has failed and release locally any resources allocated for the service request procedure; and
  if the UE triggered service request procedure from EMM-CONNECTED mode, the EMM sublayer shall abort the procedure and indicate to the MM sublayer that the CS fallback procedure has failed. The UE shall stay in EMM-CONNECTED mode.

Also, 3GPP 24.301, section 10.2, Table 10.2.1, titled "EPS mobility management timers—UE side," is as follows:

| TIMER NUM. | TIMER VALUE | STATE | CAUSE OF START | NORMAL STOP | ON EXPIRY |
|---|---|---|---|---|---|
| T3417ext | 10 s | EMM-SERVICE-REQUEST-INITIATED | EXTENDED SERVICE REQUEST sent in case d in subclause 5.6.1.1 EXTENDED SERVICE REQUEST sent in case e in subclause 5.6.1.1 and the CSFB response was set to "CS fallback accepted by the UE" | Inter-system change from S1 mode to A/Gb mode or Iu mode is completed Inter-system change from S1 mode to A/Gb mode or Iu mode is failed SERVICE REJECT received | Select GERAN or UTRAN if EXTENDED SERVICE REQUEST was sent due to mobile originated CS fallback. Otherwise, abort the procedure. |

According to various techniques, a new timer Ts14 may be used to supervise the buffering of the MT call at the MSC/VLR. The value of the timer Ts14 can be configured by the operator to a value between, for example, one second to twenty seconds (1-20 seconds).

3GPP 29.118, Table 10.1.2, titled "Management timers—VLR side" recites, in part, as follows:

| Timer name | Default value | Timer range | Granularity | Notes | Relation to other timers |
|---|---|---|---|---|---|
| Ts14 | — | 1 s to 20 s (NOTE 2) | 1 s | Guards the UE fallback procedure to UTRAN/GERAN | None. |

It is noted regarding Table 10.1.2 that if a too small value is configured, the timer Ts14 can expire before a successful fallback to UTRAN/GERAN occurs.

The network may use a configured value for this guard timer Ts14, which is unknown to the UE. On the other hand the UE may use a constant value of T3417ext, which may be, for example, ten seconds. Generally, these timers may have different values for different situations. As a result, the following two scenarios can occur:

Scenario 1) Ts14>T3417ext (illustrated and discussed with respect to FIG. 1A below):

On expiry of T3417ext, the network still has the buffered MT call at MSC/VLR. For MT calls, however, UE will abort CS fallback and not attempt to select GERAN or UTRAN radio access technology, but remain in LTE. Hence, the MT CS call will fail.

Scenario 2) Ts14<T3417ext (illustrated and discussed with respect to FIG. 1B below):

On expiry of T3417ext, which is ten seconds, the MSC/VLR will already have released the MT CS call. As a result, even if UE reselects to GERAN or UTRAN, the MT call may not be established in 2G/3G.

The following three problems may arise from these scenarios:

Problem 1) By setting Ts14>T3417ext, the operator can avoid releasing, on the network side, the MT call by the MSC/VLR too early. The UE, however, cannot make use of the fact that the MT call is still being kept until expiry of Ts14 because some systems may prevent the UE from autonomous selection of GERAN or UTRAN radio access technology.

Problem 2) The UE does not know the value of the network-internal timer Ts14. As a result, when the T3417ext timer expires the UE does not know whether autonomous selection of GERAN or UTRAN radio access technology and transmission of a paging response via GERAN/UTRAN is still worth trying.

Problem 3) In practice, the value of 10 seconds for T3417ext may be relatively long. It should be noted that the alerting of the user and the decision of the user to accept the call are taking place before this T3417ext timer is started. Essentially, T3417ext is supervising the signaling from the UE via an evolved NodeB (eNB) to the Mobility Management Entity (MME) and back to the UE, and optionally a measurement report (e.g., including measurements). The eNB may solicit this measurement report from the UE for use in determining the target GERAN/UTRAN cell to which the redirection or handover procedure will be performed.

The overall call setup time and the call success rate may be improved if T3417ext were reduced for the MT CS fallback call because in some cases the calling subscriber may hang up if the call setup takes too long.

In order to improve the success rate for MT CS fallback calls, in various embodiments:

1) For an MT CSFB call, upon expiry of T3417ext the UE may attempt to select GERAN or UTRAN radio access technology and perform required Mobility Management/Call Control (MM/CC) procedures for an MT CS call.

2) If the value of T3417ext for MT CSFB remains fixed at 10 seconds, then the MSC/VLR may preferably use values from the upper part of the value range for guard timer Ts14. In some scenarios the value range may be defined as "1-20 seconds," with a granularity of 1 second, and without a default value. Some implementations may warn against configuring a "too small value," but may have no explicit reference to the timer T3417ext, which controls the UE behavior. In some embodiments, if T3417ext has a value of 10 seconds, Ts14 may be selected from the range of 10-20 seconds.

3) In addition to 1) and 2), the UE may be allowed to use a shorter value for T3417ext for MT CSFB calls. One possible default value is about five seconds.

4) As a further enhancement (on top of 1) to 3) above), in some embodiments T3417ext may be made for MT CSFB calls configurable via Non-Access Stratum (NAS) signaling, so that the MSC/VLR and the UE can switch to using a shorter value in a coordinated way. To this purpose, during combined attach and combined Tracking Area Update (TAU) procedures the network (e.g., the MME) can provide the value of T3417ext to be used by the UE for MT CSFB in the Attach Accept and TAU Accept message. The value of T3417ext should be chosen taking the value configured in the VLR for Ts14 into account. For example, the timer value could be set to T3417ext:=Ts14−OFFSET, where OFFSET could be set to four to five seconds (4-5 sec.) to take autonomous selection of GERAN/UTRAN and "signaling overhead" into account.

If the UE received a value for "T3417ext for MT CSFB" during the last combined attach or combined TAU procedure, then the UE may use the received value for T3417ext when attempting an MT CSFB call. Upon expiry of T3417ext for an MT CSFB call the UE may attempt to select GERAN or UTRAN radio access technology and perform required MM/CC procedures for the MT CS call.

The switch to using a shorter value for "T3417ext for MT CSFB" may be coordinated between the MSC/VLR and the UE by signaling an indication from the UE via the MME to the MSC/VLR. The signaling may indicate that the UE supports configuration of T3417ext for MT CSFB calls via Non-Access Stratum (NAS) signaling.

Figure 1B:
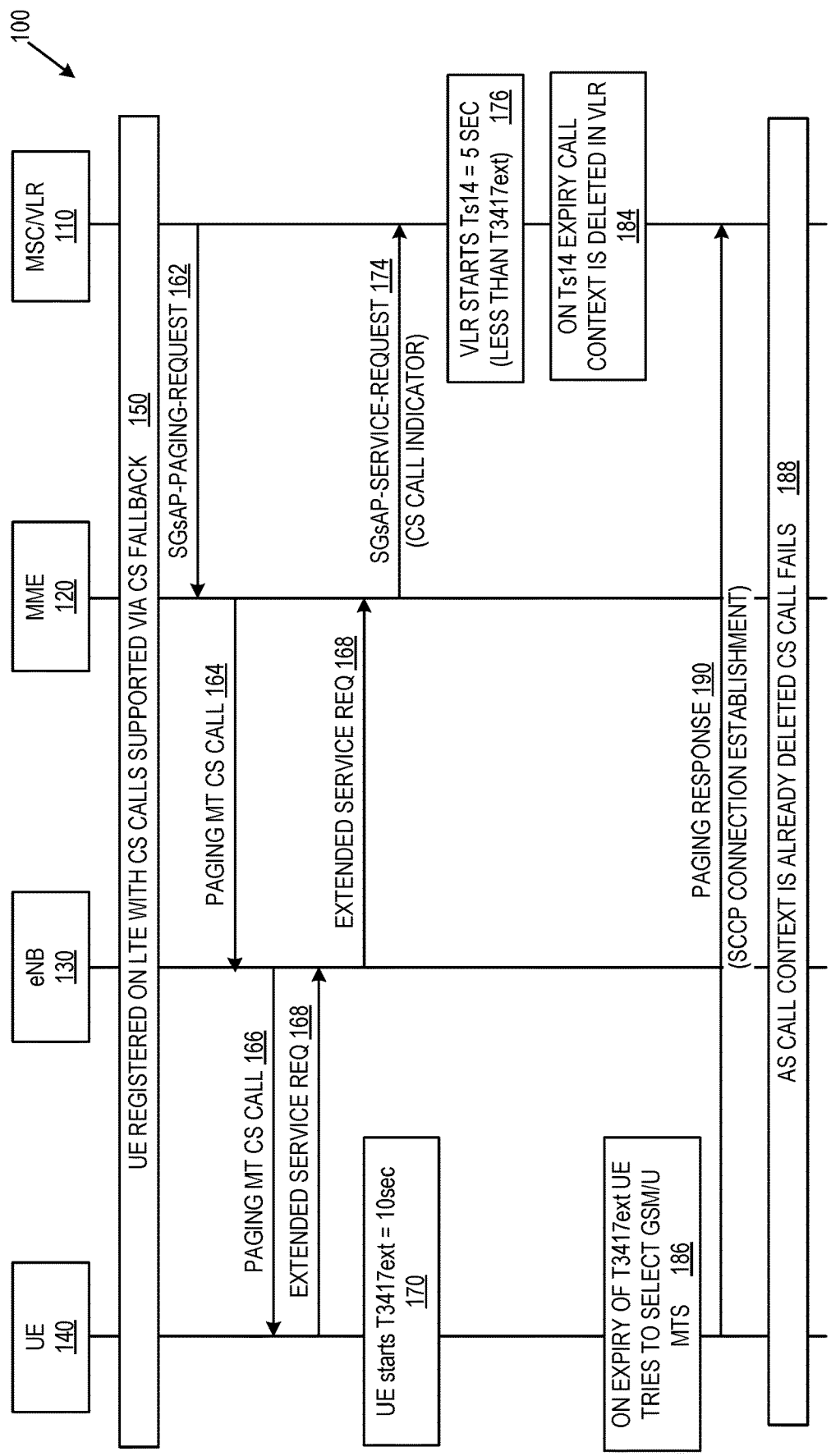

FIGS. 1A and 1B are simplified signal flow diagrams of the establishment of a mobile terminating (MT) circuit-switched (CS) fallback (FB) call in a wireless communication system 100. FIG. 1A is a simplified signal flow diagram of the system 100 having a timer value at an MSC/VLR 110 (e.g., Ts14) that is greater than a timer value at a UE 140 (e.g., T3417ext). FIG. 1B is a simplified signal flow diagram of the system 100 having a timer value at the MSC/VLR 110 (e.g., Ts14) that is less than a timer value at the UE 140 (e.g., T3417ext). The system 100 includes the MSC/VLR 110, an MME 120, an eNB 130, and the UE 140. As indicated in box 150 of FIGS. 1A and 1B, the UE 140 may be registered on long-term-evolution (LTE) with CS calls supported via CS fallback.

In operation, the MSC/VLR 110 may generate and transmit, to the MME 120, an SGsAP-Paging request 162. The MME 120 may generate and transmit, to the eNB 130, an S1AP paging MT CS call signal 164. Upon receipt of the S1AP paging MT CS call signal 164, the eNB 140 may generate and transmit, to the UE 140, forward an RRC paging MT CS call signal 166 to the UE 140. The UE 140 may, responsive to receiving the RRC paging MT CS call signal 166, generate and transmit, to the eNB 130, an extended service request 168. The eNB 130 may forward the extended service request 168 to the MME 120. The UE 140 may start 170 a T3417ext timer (which may have a value of ten seconds) responsive to transmitting the extended service request 168.

Responsive to receiving the extended service request 168, the MME 120 may generate and transmit, to the MSC/VLR 110, an SGsAP-service-request 174 including a CS call indicator. Responsive to receiving the SGsAP-service-request 174 the MSC/VLR 110 may start 176 a Ts14 timer. The Ts14 timer may have a value that is greater than that of T3417ext at the UE (e.g., fifteen seconds) in FIG. 1A, or a value that is less than that of T3417ext at the UE (e.g., five seconds) in FIG. 1B. On expiry of the Ts14 timer at the MSC/VLR 110, the MSC/VLR 110 deletes 184 the call context.

The system 100 may suffer from the problems discussed above. For example, the network MSC/VLR 110 may start 176 the variable timer Ts14, which is in the range of one to twenty seconds (1-20 sec.), and the UE 140 may start 170 the T3417ext timer with a value of ten seconds (10 sec.). Although the MSC/VLR 110 buffers the call until the Ts14 timer expires, the UE 140 aborts the CS fallback procedure and the call fails upon expiry of the T3417ext timer at the UE 140. As a result, the following scenarios are possible:

Scenario 1) Ts14>T3417ext (FIG. 1A):
As seen in FIG. 1A, the network MSC/VLR 110 selects timer Ts14, which is greater than T3417ext. As a result, on expiry of T3417ext, although the network still has a buffered MT call at the MSC/VLR 110, the UE 140 will abort 172 the MT CS fallback procedure without triggering an autonomous IRAT transition to 2G/3G and the MT call will fail, as illustrated by box 182 of FIG. 1A.

Scenario 2) Ts14<T3417ext (FIG. 1B):
As seen in FIG. 1B, when the network MSC/VLR 110 selects the timer Ts14, which has a value that is smaller than that of timer T3417ext, upon expiry of Ts14 the MSC/VLR 110 will release the MT CS call and delete 184 the MT CS call context. Accordingly, the MT call will fail even if the UE 140 reselects 186 to a GSM or UTRAN network when T3417ext expires after 10 seconds. The UE 140 generates and transmits, to the MSC/VLR 110 (e.g., via the eNB 130 and the MME 120), a PAGING RESPONSE message 190 causing a Signaling Connection Control Part (SCCP) connection establishment. As the call context is already deleted, however, the CS call cannot be established, and therefore fails, as indicated by box 188 of FIG. 1B.

Figure 2:
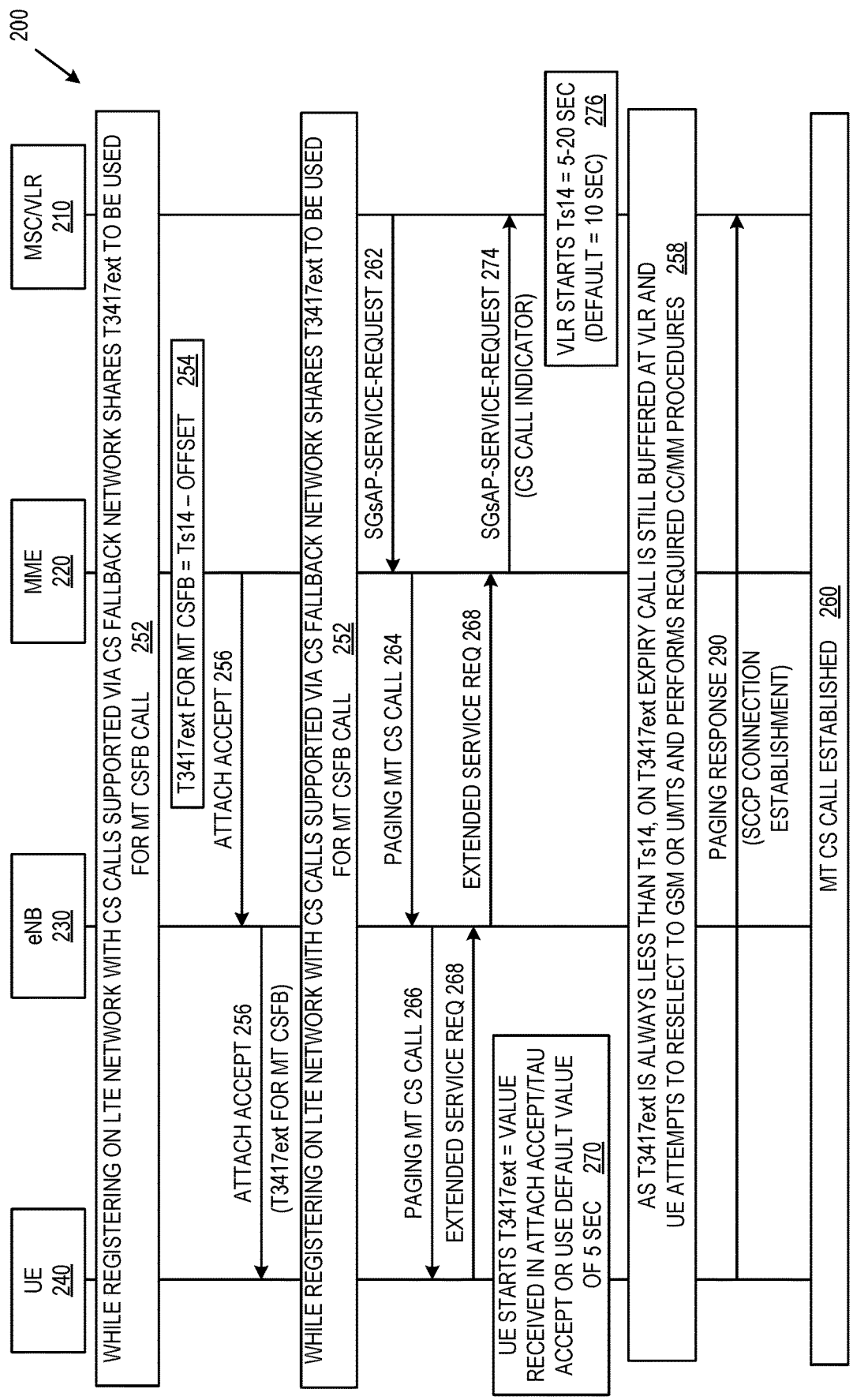
FIG. 2 is a simplified signal flow diagram of a successful establishment of a MT CSFB call in wireless communication system, according to some embodiments.

FIG. 2 is a simplified signal flow diagram of a successful establishment of an MT CSFB call in a wireless communication system 200, according to some embodiments. The wireless communication system 200 includes an MSC/VLR 210, an MME 220, an eNB 230, and a UE 240. As indicated by boxes 252 and 254, while registering on an LTE network with CS calls supported via CS fallback, the network may share T3417ext to be used for an MT CSFB call.

As illustrated in FIG. 2, the network (for example, the MME 220) may set a value of the timer T3417ext for MT CSFB. The value of the T3417ext timer may be chosen taking the value configured in the MCS/VLR 210 for Ts14 into account. For example, the network may select the value of T3417ext to be equal to a value for the timer Ts14 minus an offset amount, as illustrated in box 254. The value of the offset could be set to, for example, four or five seconds to take autonomous selection of GERAN/UTRAN and "signaling overhead" into account. Also, the network (e.g., the MME 220) may provide the value T3417ext to be used by the UE 240 for MT CSFB during a combined attach or TAU procedure in an accept message 256 (e.g., an Attach Accept message or a TAU Accept message).

If the value of T3417ext is not provided in the combined Attach Accept message or TAU Accept message, the UE 240 may use a relatively small value of the timer T3417 for MT CSFB calls. For example, a default value for T3417ext may be about five seconds.

The network (e.g., the MSC/VLR 210) may use a value for the guard timer Ts14 from the upper part of the value range. 3GPP 29.118, Table 1.10.2 defines the value of Ts14 to be "1-20 seconds," with a granularity of one second, and without a default value. If T3417ext has a value of ten seconds (10 sec.), Ts14 may be selected from the range of ten to twenty seconds (1-20 sec.).

Similarly as discussed above with reference to FIGS. 1A and 1B, the MSC/VLR 210 may generate and transmit, to the MME 220, an SGsAP-PAGING-REQUEST message 262. The MME 220 may generate and transmit, to the eNB 230, an S1AP paging MT CS call message 264. Upon receipt of the S1AP paging MT CS call message 264, the eNB 230 may generate and transmit, to the UE 240, an RRC paging MT CS call message 266. The UE 240 may, responsive to receiving the RRC paging MT CS call message 266, generate and transmit, to the eNB 230, an extended service request message 268 and start 270 the T3417ext timer (which may have a value received in the accept message 256 (e.g., an Attach Accept message or a TAU Accept message), or may be a default value (e.g., about five seconds)). The eNB 230 may forward the extended service request message 268 to the MME 220, which may generate and transmit, to the MSC/VLR 210, an SGsAP-service-request message 274 including a CS call indicator. The MSC/VLR 210 may, responsive to the SGsAP-service-request message 274, start 276 the Ts14 timer (which may be between five and twenty seconds (5-20 sec.), and may have a default value of ten seconds (10 sec.)).

As indicated in box 258 of FIG. 2, since the value of the T3417ext timer is always less than Ts14, on expiry of the T3417ext timer the call is still buffered at the MSC/VLR 210 and the UE 240 attempts to reselect to GSM or UMTS and performs corresponding CC/MM procedures. In other words, for an MT CSFB call, upon expiry of the T3417ext timer, the UE 240 may attempt to select GERAN or UTRAN radio access technology and perform corresponding MM/CC procedures for the MT CS call. As T3417ext is chosen a bit shorter than the Ts14, even after T3417ext expiry, the MSC/VLR 210 still has the buffered call, and UE 240, after selecting the GERAN/UTRAN, can successfully establish the MT CS call. The UE 240 generates and transmits a PAGING RESPONSE message 290 (e.g., causing an SCCP connection establishment) to the MSC/VLR 210, and an MT CS call is established, as indicated by box 260.

The switch to using a shorter value for "T3417ext for MT CSFB" as compared to that of 3GPP 24.301, section 10.2 (Table 10.2.1) may be coordinated between the network (e.g., the MME 220, the MSC/VLR 210) and the UE 240 because usually in a mobile network there will be new UEs supporting the shorter value for T3417ext for MT CSFB and old UEs not supporting the shorter value for T3417ext for MT CSFB.

As a specific, non-limiting example, if the network reduces Ts14 e.g. to a value of eight seconds and signals to the UE 240 to use a value of four seconds (4 sec.) for T3417ext, then a legacy UE would not support this shorter value for T3417 and use the fixed value of 10 seconds, as defined in 3GPP 24.301, section 10.2 (Table 10.2.1). As a result, the old UEs would perform as discussed above with reference to FIG. 1B above.

Figure 3:
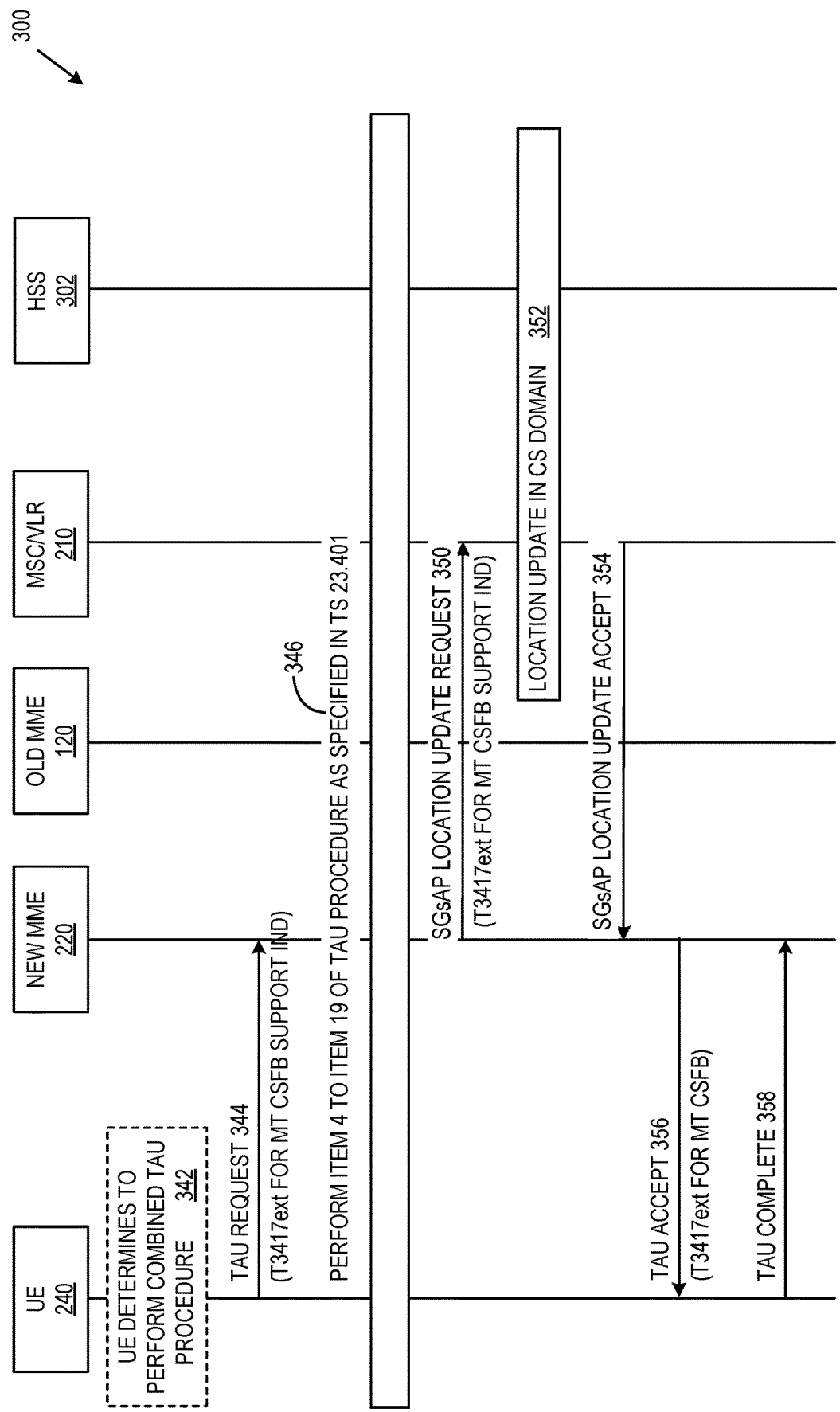
FIG. 3 is a simplified signal flow diagram of a tracking area updating procedure in an example wireless communication system of the communication system of FIG. 2, according to some embodiments.
Figure 4:
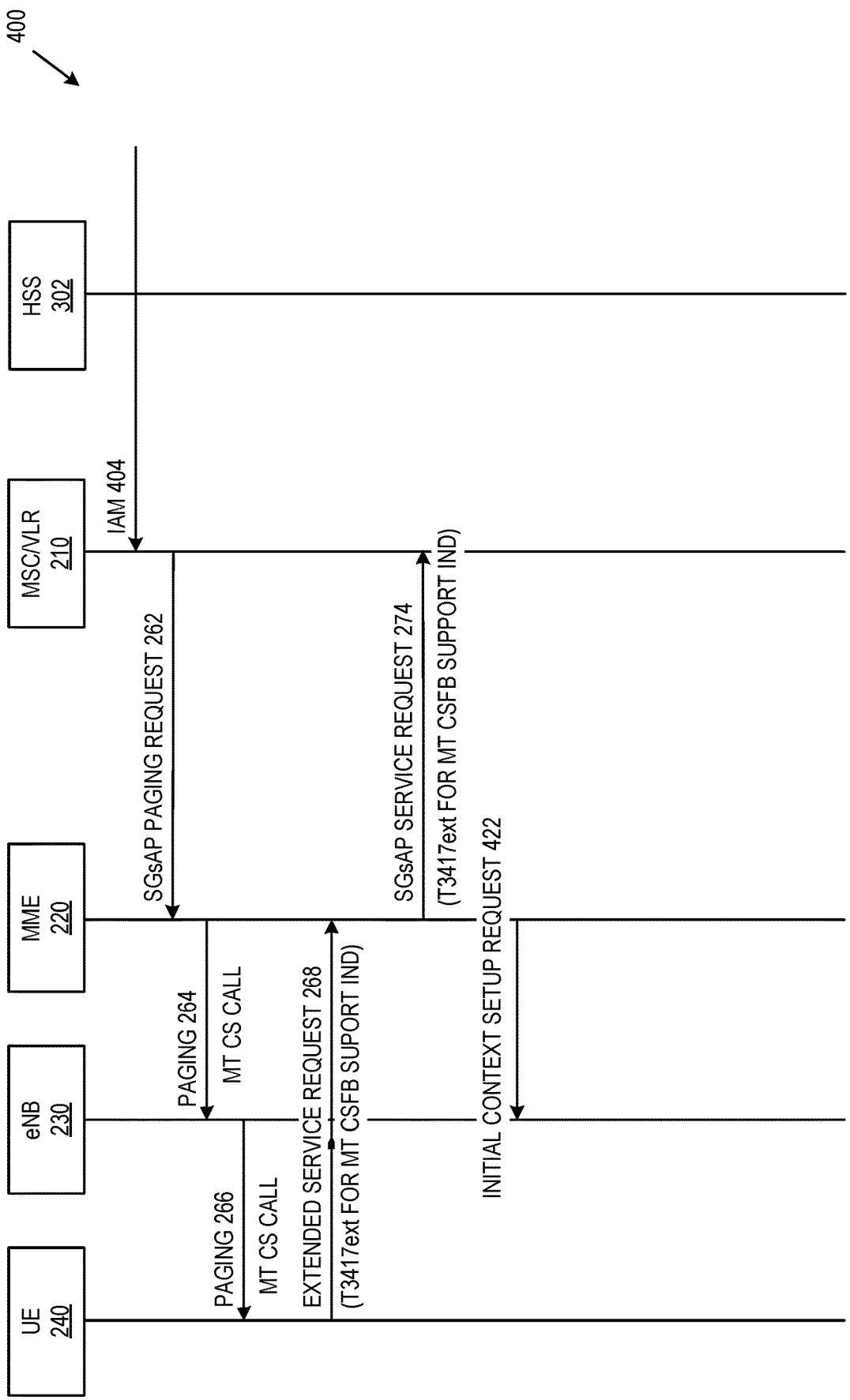
FIG. 4 is a simplified signal flow diagram of the establishment of an MT CSFB call in an example wireless communication system of the communication system of FIG. 2, according to some embodiments.

There are different options as to how the UE 240 can signal an indication from the UE 240 via the MME 220 to the MSC/VLR 210 to indicate that the UE 240 supports configuration of T3417ext for MT CSFB calls via NAS signaling. FIGS. 3 and 4 illustrate two of these options.

FIG. 3 is a simplified signal flow diagram of a tracking area updating procedure in an example wireless communication system 300 of the communication system 200 of FIG. 2, according to some embodiments. FIG. 3 illustrates an example of how the UE 240 may signal (e.g., via NAS signaling) an indication to the MSC/VLR 210 via the MME 220 indicating that the UE 240 supports configuration of the T3417ext timer for MT CSFB calls. In some embodiments, the UE 240 may determine 342 to perform a combined attach or TAU procedure. During the combined attach or TAU procedure the UE 240 indicates in a request message 344 (e.g., an Attach Request message or a TAU Request message) that the UE 240 supports configuration of T3417ext for MT CSFB via NAS signaling. By way of non-limiting example, the TAU request message 344 may include a new information element or a new parameter in the UE network capability information element indicating that the UE 240 supports configuration of T3417ext for MT CSFB via NAS signaling. The network (e.g., the new MME 220, the old MME 120, the MSC/VLR 210, and a Home Subscriber Server (HSS) 302) may perform 346 a TAU procedure as specified in TS 23.401.

If the UE 240 indicates support of configuration of the T3417ext timer for MT CSFB calls, then the MME 220 provides this information to the MSC/VLR 210 (e.g., in the form of a support indicator in an SGsAP Location Update Request message 350 via an SGs interface). In some embodiments, instead of a support indicator, the MME 220 could also provide an information element including the value of T3417ext for MT CSFB to the MSC/VLR 210. Upon receipt of the SGsAP Location Update Request message 350, the MSC/VLR 210 stores the information indicating whether the UE 240 supports configuration of T3417ext for MT CSFB via NAS signaling. As indicated by box 352, the network performs a location update in the CS domain, and the MSC/VLR 210 generates and transmits, to the new MME 220, an SGsAP location update accept message 354. The new MME 220 generates and transmits, to the UE 240, an accept message 356 (e.g., a TAU Accept message), which indicates a value of the T3417ext timer for MT CSFB. By way of non-limiting example, the MME 220 sends a value for T3417ext for MT CSFB to the UE 240 with Attach Accept or TAU Accept only, if the UE 240 indicated support of the feature in Attach/TAU Request 344. Later, when the UE 240 responds to a paging for an MT CS call message 266 (FIG. 2), the MSC/VLR 210 uses this information to decide whether to start Ts14 with a value suitable for the configured value of T3417ext or with a default value suitable for T3417ext=10 seconds.

Another option is for the MME 220 to always include a configured value for T3417ext for MT CSFB during the combined attach or TAU procedure in the accept message 256 (e.g., an Attach Accept message or a TAU Accept message) (FIG. 2). For this case the UE 240 may indicate during the MT call establishment whether it supports configuration of T3417ext for MT CSFB via NAS signaling. FIG. 4 illustrates some embodiments of this option.

FIG. 4 is a simplified signal flow diagram of the establishment of an MT CSFB call in an example wireless communication system 400 of the communication system 200 of FIG. 2, according to some embodiments. FIG. 4 illustrates an example of how the UE 240 may signal (e.g., via NAS signaling) an indication to the MSC/VLR 210 via the MME 220 indicating that the UE 240 supports configuration of the T3417ext timer for MT CSFB calls. The MSC/VLR 210 may receive an Initial Address Message (IAM) 404 indicating information corresponding to an MT CSFB call. The MSC/VLR 210 may generate an SGsAP-PAGING-REQUEST message 262, and transmit the SGsAP-PAGING-REQUEST message 262 to the MME 220. The MME 220 may generate and transmit, to the eNB 230, an S1AP paging MT CS call message 264. The eNB 230 may generate and transmit an RRC paging MT CS call message 266 to the UE 240. As shown in FIG. 4, when the UE 240 responds to the RRC paging MT CS call message 266, the UE 240 indicates support of the feature in the Extended Service Request message 268, which the UE 240 transmits to the eNB 230. The eNB 230 forwards the Extended Service Request 268 to the MME 220. The MME 220 forwards this support indication received in the Extended Service Request message 268 to the MSC/VLR 210 in an SGsAP-service-request message 274. Dependent on the presence or absence of the support indication in the SGsAP-service-request message 274, the MSC/VLR 210 selects the start value for Ts14. The MME 220 transmits an S1AP-initial-context-setup-request message 422 to the eNB 230.

After the UE context setup the procedure continues as described in the active mode mobile terminated call procedures described in clauses 7.3 and 7.4 of 3GPP TS 23.272. If the eNB 230 knows that Packet Switched Handover (PS HO) is supported, the procedure in clause 7.3 "Mobile Terminating call in Active Mode —PS HO supported" may be applied from act 2 in clause 7.3, and onwards. If the eNB 230 knows that PS HO is not supported the procedure in clause 7.4 "Mobile Terminating call in Active Mode—No PS HO support" may be applied from act 2 in Clause 7.4, and onwards.

In various embodiments, the 3GPP standards may be replaced with the following:

3GPP 24.301, section 5.6.1.6: (On T3417ext expiry do not differentiate MO and MT call, UE shall attempt to reselect the GERAN or UTRAN cell and continue with MM/CC procedure)

d) T3417ext expired

If a CS fallback cancellation request was not received, the UE shall attempt to select GERAN or UTRAN radio access technology. If the UE finds a suitable GERAN or UTRAN cell, it then proceeds with the appropriate MM and CC specific procedures and the EMM sublayer shall not indicate the abort of the service request procedure to the MM sublayer. Otherwise the EMM sublayer shall indicate the abort of the service request procedure to the MM sublayer, and the UE shall also set the EPS update status to EU2 NOT UPDATED and enter the state EMM-REGISTERED.ATTEMPTING-TO-UPDATE.

If a CS fallback cancellation request was received the UE shall set the EPS update status to EU2 NOT UPDATED and enter the state EMM-REGISTERED.ATTEMPTING-TO-UPDATE.

3GPP 24.301, section 10.2, Table 10.2.1: EPS mobility management timers—UE side (new timer value T3417ext-MT added and Note added)

| TIMER NUM. | TIMER VALUE | STATE | CAUSE OF START | NORMAL STOP | ON EXPIRY |
|---|---|---|---|---|---|
| T3417ext | 10 s | EMM-SERVICE-REQUEST-INITIATED | EXTENDED SERVICE REQUEST sent in case d in subclause 5.6.1.1 | Inter-system change from S1 mode to A/Gb mode or Iu mode is completed Inter-system change from S1 mode to A/Gb mode or Iu mode is failed SERVICE REJECT received | Select GERAN or UTRAN |
| T3417ext-MT | Default 5 s/ Note X | EMM-SERVICE-REQUEST-INITIATED | EXTENDED SERVICE REQUEST sent in case e in subclause 5.6.1.1 and the CSFB response was set to "CS fallback accepted by the UE" | Inter-system change from S1 mode to A/Gb mode or Iu mode is completed Inter-system change from S1 mode to A/Gb mode or Iu mode is failed SERVICE REJECT received | Select GERAN or UTRAN |

Note

X: If the MME does not include a timer value for T3417ext-MT in the ATTACH ACCEPT message or TRACKING AREA UPDATE ACCEPT message, the default value of this timer is 5 s.

3GPP 29.118 Table 10.1.2: Management timers—VLR side (Default timer updated to 5 s to 20 s and description of relation to other timers added)

| Timer name | Default value | Timer range | Granularity | Notes | Relation to other timers |
|---|---|---|---|---|---|
| Ts14 | — | 45 s to 20 s (NOTE 2) | 1 s | Guards the UE fallback procedure to UTRAN/ GERAN | It is expected to take a value greater than T3417ext-MT. Otherwise, the UE can attempt to select GERAN/UTRAN although the call is already released. |

...
NOTE
2: If a too small value is configured, the timer can expire before a successful fallback to UTRAN/GERAN occurs.

3GPP 24.301, section 8.2.1, Table 8.2.1.1: ATTACH ACCEPT message content (new information element included at the end of the message)

| IEI | Information Element | Type/Reference | Presence | Format | Length |
|---|---|---|---|---|---|
| ... | | | | | |
| XX | T3417ext-MT value | GPRS timer 2 9.9.3.16A | O | TLV | 3 |

3GPP 24.301, section 8.2.26, Table 8.2.26.1: TRACKING AREA UPDATE ACCEPT message content (new information element included at the end of the message)

| IEI | Information Element | Type/Reference | Presence | Format | Length |
|---|---|---|---|---|---|
| ... | | | | | |
| XX | T3417ext-MT value | GPRS timer 2 9.9.3.16A | O | TLV | 3 |

Example Signaling for Embodiments of FIG. 3:
   3GPP 24.301, section 9.9.3.34: UE network capability information element (new flag included to indicate support of T3417ext-MT)

| 8 | 7 | 6 | 5 | 4 | 3 | 2 | 1 | |
|---|---|---|---|---|---|---|---|---|
| | | | UE network capability IEI | | | | | octet 1 |
| | | | Length of UE network capability contents | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| UCS2 | UIA1 | UIA2 | UIA3 | UIA4 | UIA5 | UIA6 | UIA7 | octet 6* |
| ProSe-dd | ProSe | H.245-ASH | ACC-CSFB | LPP | LCS | 1xSRVCC | NF | octet 7* |
| ePCO | HC-CP CloT | ERw/oPDN | S1-U data | UP CIoT | CP CIoT | Prose-relay | ProSe-dc | octet 8* |
| 0 Spare | 0 Spare | 0 Spare | 0 Spare | T3417ext-MT | RestrictEC | V2XPC5 | multipleDRB | octet 9* |
| 0 | 0 | 0 | 0 | 0 | 0 | 0 | 0 | octet 10*-15* |
| | | | | Spare | | | | |

Figure 9:
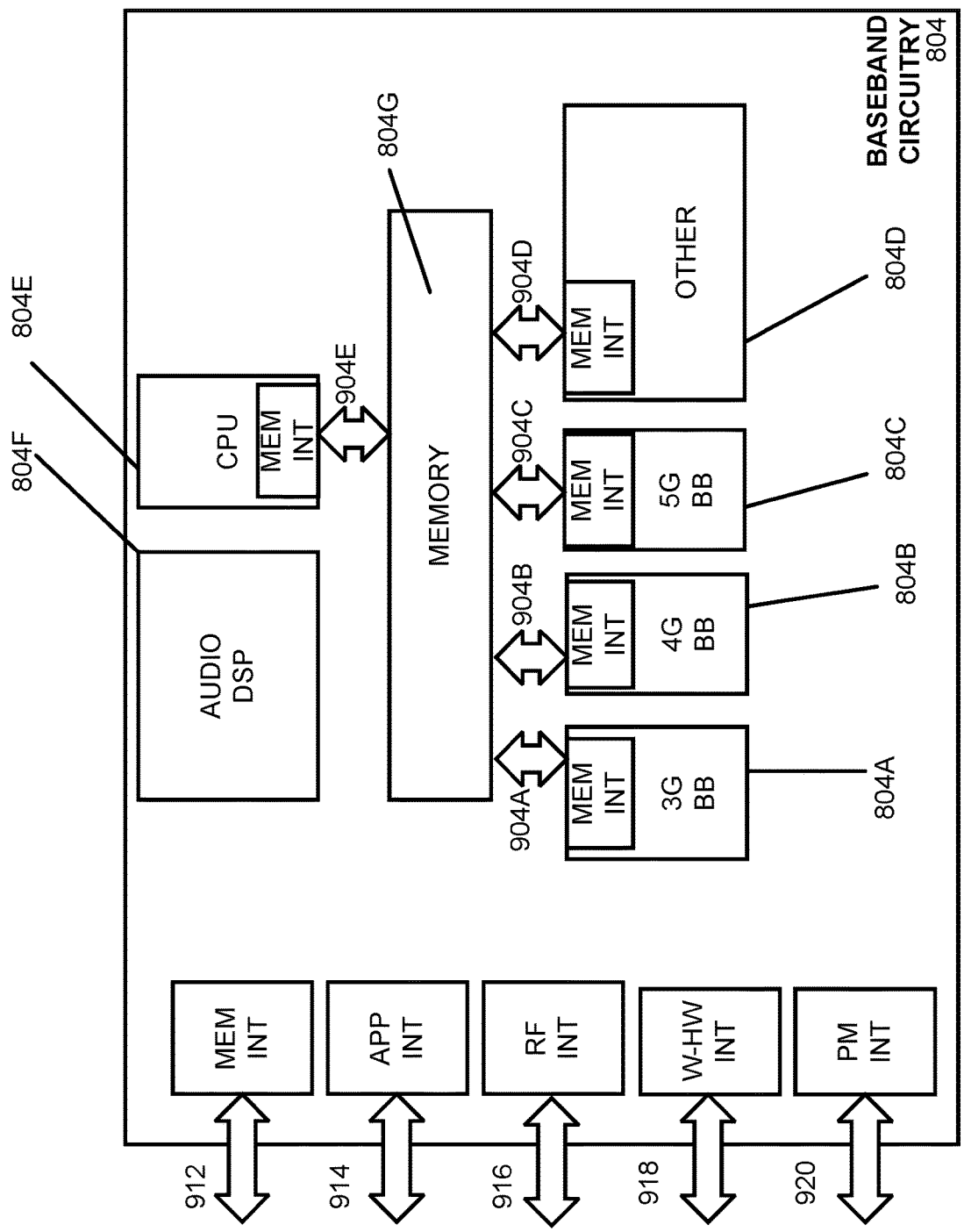
FIG. 9 illustrates example interfaces of baseband circuitry in accordance with some embodiments.

FIG. 9.9.3.34.1: UE network capability information element

TABLE 9.9.3.34.1

| UE network capability information element: |
|---|
| ... |
| T3417ext-MT (octet 9, bit 4) |
| This bit indicates the capability to receive a value for timer T3417ext-MT to be used for a service request procedure for an MT CSFB calls with NAS signalling. |
|   0   Receipt of T3417ext-MT not supported |
|   1   Receipt of T3417ext-MT supported |

Example Signaling for Embodiments of FIG. 4:
   3GPP 24.301, section 8.2.15, Table 8.2.15.1: EXTENDED SERVICE REQUEST message content (new information element included at the end of the message)

TABLE 8.2.15.1

EXTENDED SERVICE REQUEST message content

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Extended service request message identity | Message type 9.8 | M | V | 1 |
| | Service type | Service type 9.9.3.27 | M | V | ½ |
| | NAS key set identifier | NAS key set identifier 9.9.3.21 | M | V | ½ |
| | M-TMSI | Mobile identity 9.9.2.3 | M | LV | 6 |
| B- | CSFB response | CSFB response 9.9.3.5 | C | TV | 1 |
| 57 | EPS bearer context status | EPS bearer context status 9.9.2.1 | O | TLV | 4 |
| D- | Device properties | Device properties 9.9.2.0A | O | TV | 1 |
| X- | T3417ext-MT support indication | T3417ext-MT support indication 9.9.x.y | O | TV | 1 |

FIG. 5 is a simplified flowchart illustrating a method 500 of operating a UE in a wireless communication system, according to some embodiments. In some embodiments, the electronic device(s), network(s), system(s), chip(s) or component(s), or portions or implementations thereof, of FIGS. 7 through 12, or some other figure herein may be configured to perform one or more processes, techniques, or methods as described herein, or portions thereof. One such process 500 is depicted in FIG. 5. For example, the process 500 may include: identifying 510 or causing to identify a page for a mobile terminating (MT) circuit-switched fallback (CSFB) call; sending 520 or causing to send a service request message to a network; starting 530 or causing to start a timer for performance of a network triggered change to a radio access network (RAN); and upon expiry of the timer prior to establishment of the network triggered change to the radio access network, performing 540 or causing to perform a UE initiated change to the radio access network and establishing or causing to establish the MT CSFB call.

FIG. 6 is a simplified flowchart illustrating a method 600 of operating a wireless communication system, according to some embodiments. In some embodiments, the electronic device(s), network(s), system(s), chip(s) or component(s), or portions or implementations thereof, of FIGS. 7 through 12, or some other figure herein, may be configured to perform one or more processes, techniques, or methods as described herein, or portions thereof. One such process 600 is depicted in FIG. 6. For example, the process 600 may include: identifying 610 or causing to identify a service request message sent from a user equipment (UE) in response to a paging for a mobile terminating (MT) circuit-switched (CS) call via CS fallback (FB); starting 620 or causing to start a supervision timer; and if the timer expires before identification of a paging response message sent from a radio access network associated with the method, releasing 630 or causing to release the MT CSFB call; wherein the supervision timer is longer than a timer used by the UE to supervise a CSFB procedure.

Figure 7:
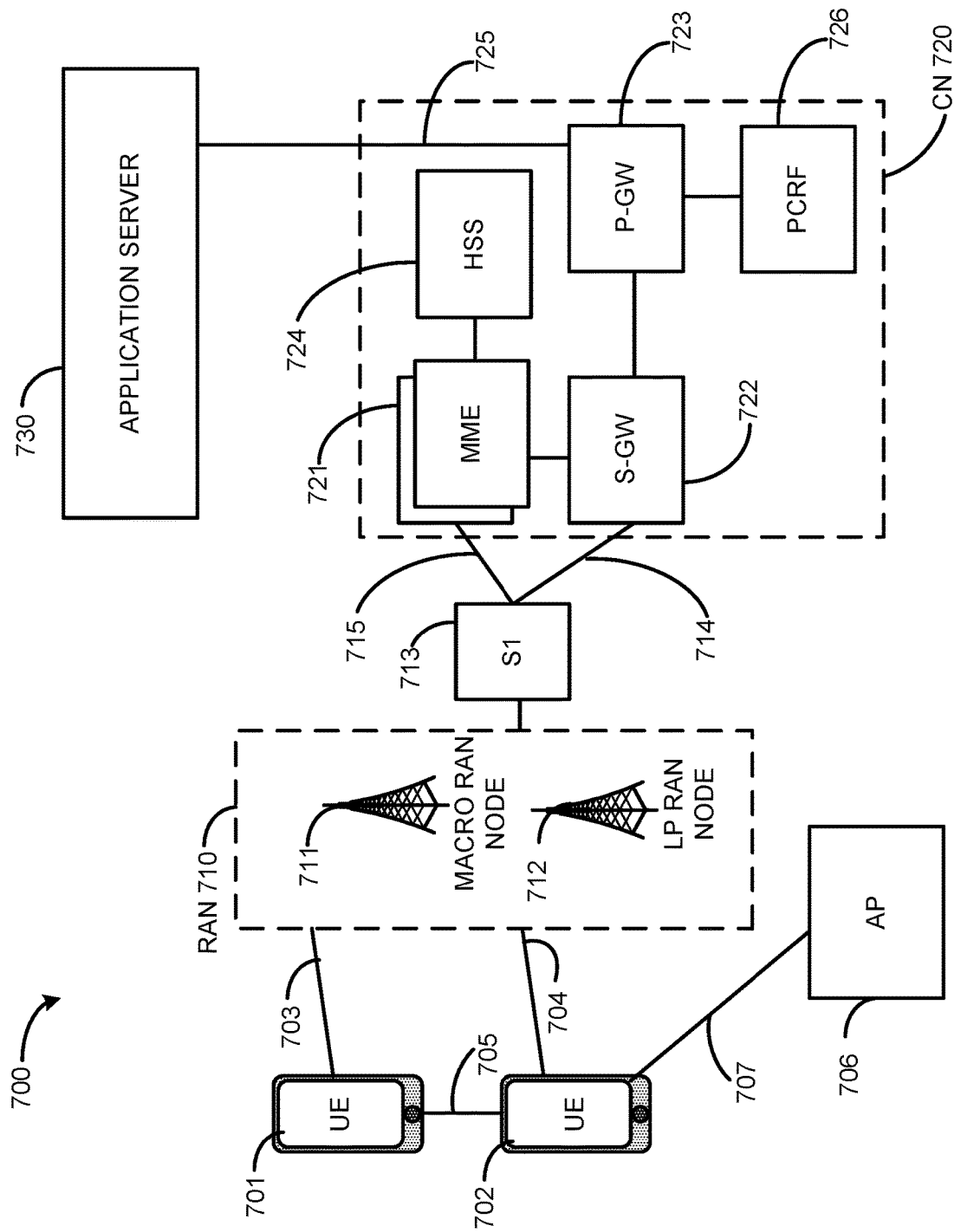
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710. The RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 may be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and a serving gateway (S-GW) 722, and an S1-mobility management entity (MME) interface 715, which is a signaling interface between the RAN nodes 711 and 712 and MMEs 721.

In this embodiment, the CN 720 comprises the MMEs 721, the S-GW 722, a Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the CN 720 (e.g., an EPC network) and external networks such as a network including the application server 730 (alternatively referred to as application function (AF)) via an Internet Protocol (IP) interface 725. Generally, an application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. A Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
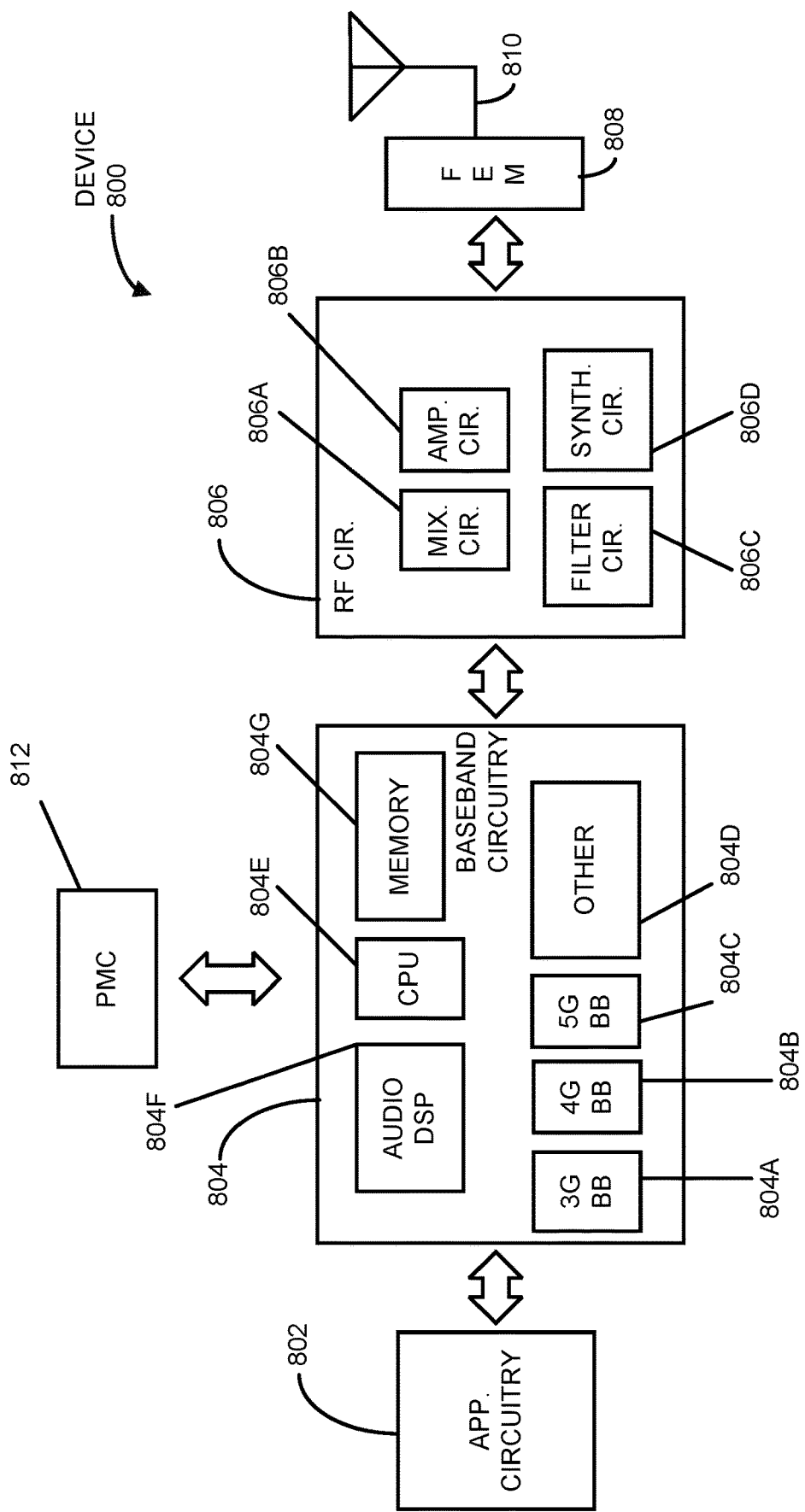
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. The RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806A, amplifier circuitry 806B and filter circuitry 806C. In some embodiments, the transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by the filter circuitry 806C.

In some embodiments, the mixer circuitry 806A of the receive signal path and the mixer circuitry 806A of the transmit signal path may include two or more mixers and may be arranged for quadrature downconversion and upconversion, respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry 806A may be arranged for direct downconversion and direct upconversion, respectively. In some embodiments, the mixer circuitry 806A of the receive signal path and the mixer circuitry 806A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-N synthesizer or a fractional N/N+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 806D of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. The FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include a Low-Noise Amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device 800 is included in a UE. The PMC 812 may increase the power conversion efficiency while providing desirable implementation size and heat dissipation characteristics.

FIG. 8 shows the PMC 812 coupled only with the baseband circuitry 804. However, in other embodiments, the PMC 812 may be additionally or alternatively coupled with, and perform similar power management operations for, other components such as, but not limited to, the application circuitry 802, the RF circuitry 806, or the FEM circuitry 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812).

Figure 10:
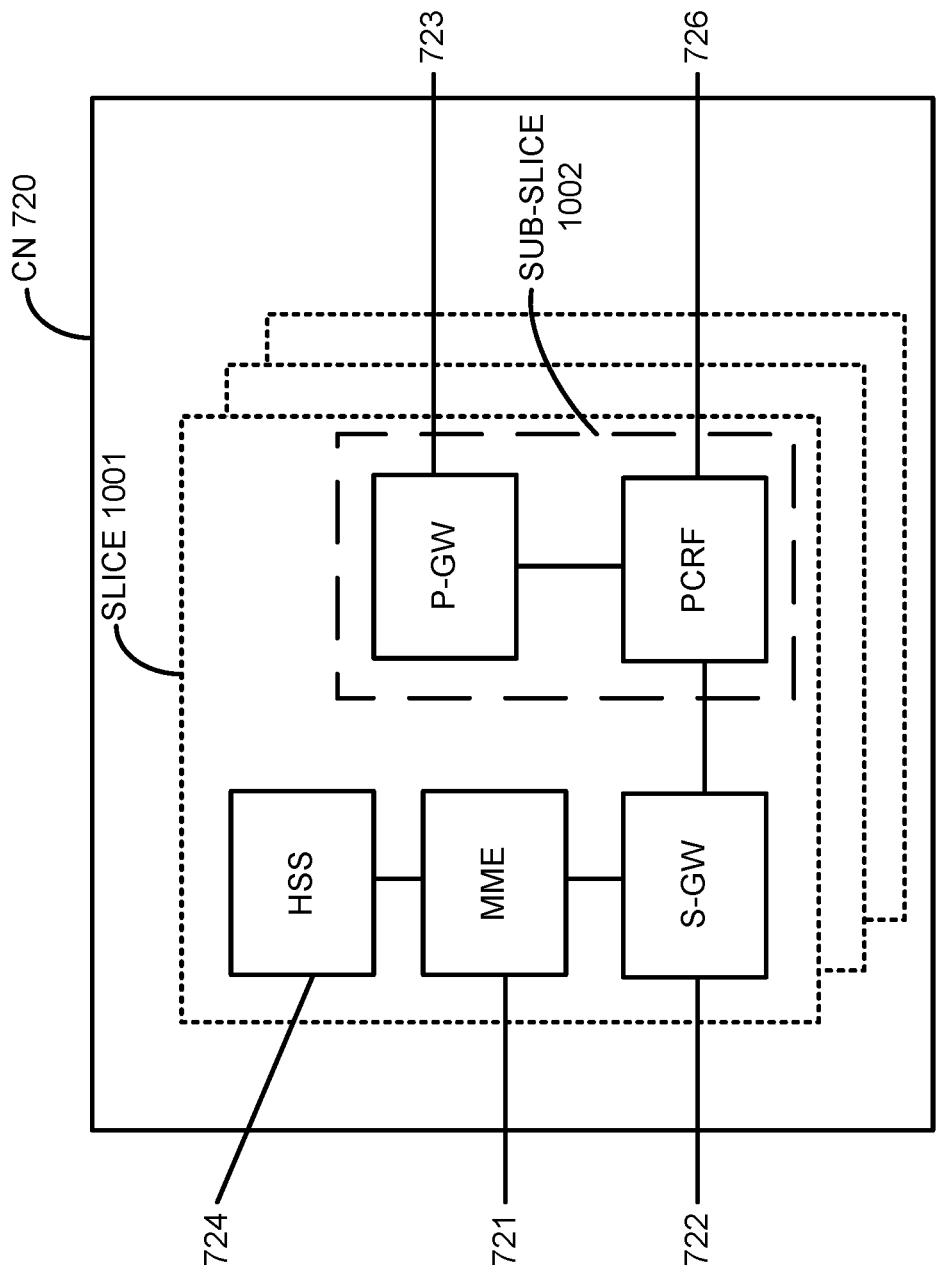
FIG. 10 illustrates components of a core network in accordance with some embodiments.

FIG. 10 illustrates components of a core network in accordance with some embodiments. The components of the CN 720 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 720 may be referred to as a network slice 1001. A logical instantiation of a portion of the CN 720 may be referred to as a network sub-slice 1002 (e.g., the network sub-slice 1002 is shown to include the P-GW 723 and the PCRF 726).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
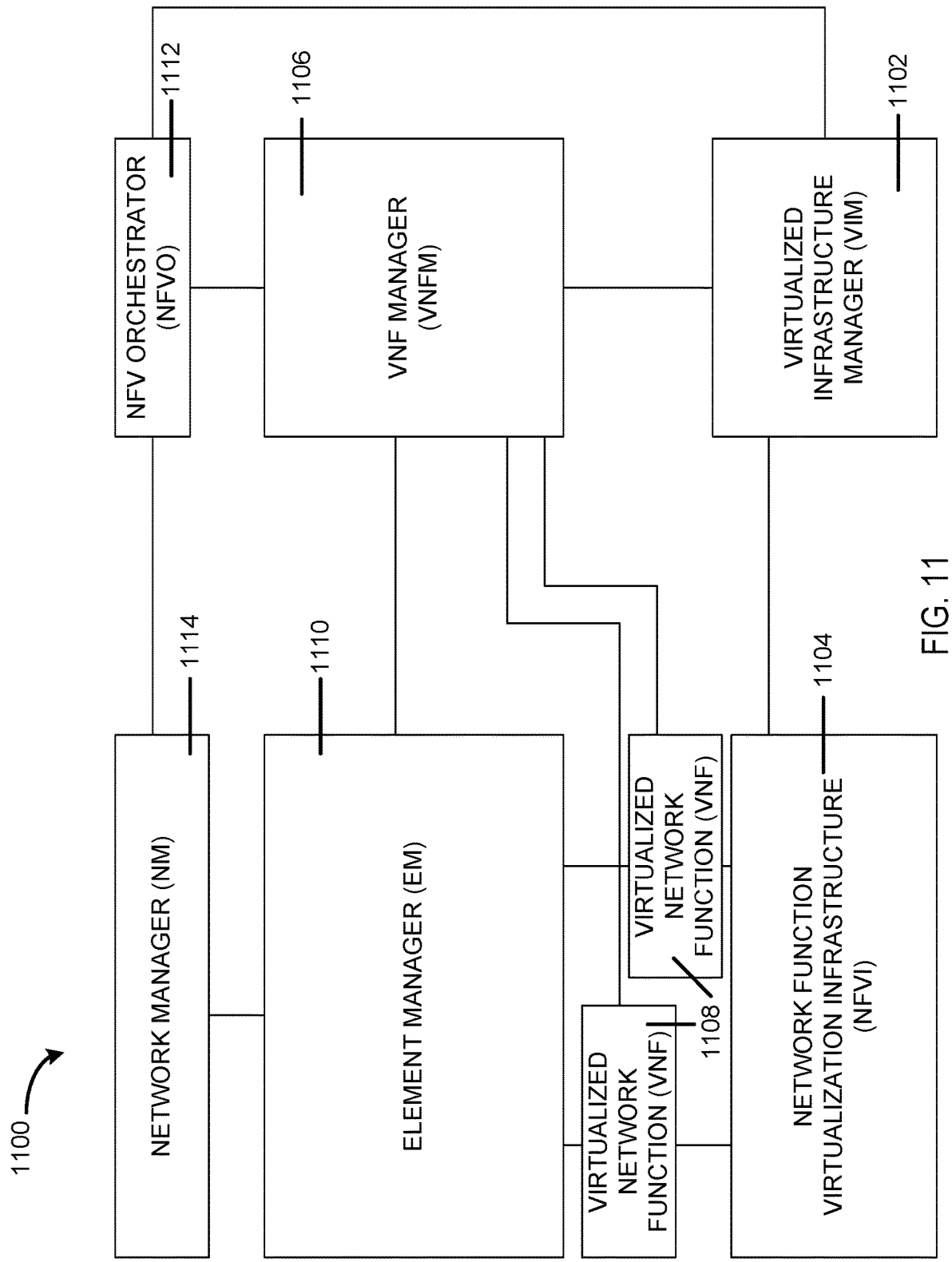
FIG. 11 is a block diagram illustrating components, according to some example embodiments, of a system to support NFV.

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
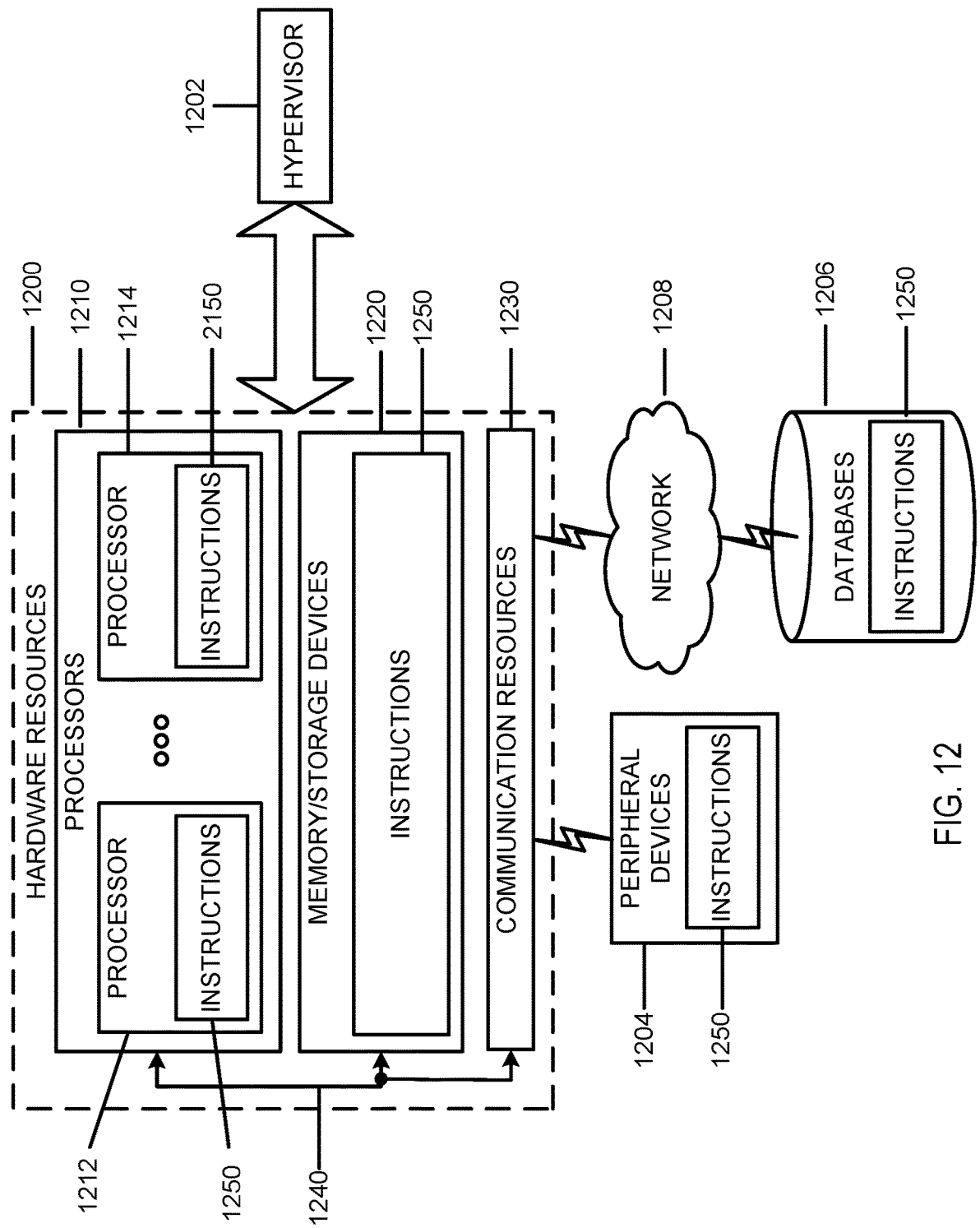
FIG. 12 is a block diagram illustrating components, according to some example embodiments, able to read instructions from a machine-readable or computer-readable medium and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In embodiments, the system of FIGS. 8 and 12, and particularly the baseband circuitry of FIG. 9, may be to: identify a page for a mobile terminating (MT) circuit-switched fallback (CSFB) call; send a service request message to a network; starting or causing to start a timer for performance of a network triggered change to a radio access network (RAN); and upon expiry of the timer prior to establishment of the network triggered change to the radio access network, perform a UE initiated change to the radio access network and establish the MT CSFB call. In other embodiments, the system of FIGS. 8 and 12, and particularly the baseband circuitry of FIG. 9, may be to: identify a service request message sent from a user equipment (UE) in response to a paging for an mobile terminating (MT) circuit-switched (CS) call via CS fallback (FB); start a supervision timer; and if the timer expires before identification of a paging response message sent from a radio access network associated with the apparatus, end the MT CSFB call; wherein the supervision timer is longer than a timer used by the UE to supervise a CSFB procedure.

Examples

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1 may include an apparatus including: means for identifying or causing to identify a page for a mobile terminating (MT) circuit-switched fallback (CSFB) call; means for sending or causing to send a service request message to a network; means for starting or causing to start a timer for performance of a change to a radio access network; and means for, upon expiry of the timer prior to establishment of the change to the radio access network, initiating or causing to initiate a change to the radio access network and establishing or causing to establish the MT CSFB call.

Example 2 may include the apparatus of example 1 or some other example herein, wherein the service request message is an Extended Service Request message.

Example 3 may include the apparatus of examples 1, 2 or some other example herein, wherein the radio access network includes a GSM/EDGE Radio Access Network (GERAN) or a Universal Terrestrial Radio Access Network (UTRAN).

Example 4 may include the apparatus of any of examples 1-3 or some other example herein, further including means for recognizing or causing to recognize that the establishment of the change to the radio access network has not occurred.

Example 5 may include the apparatus of example 4 or some other example herein, wherein means for recognizing or causing to recognize that the establishment of the change to the radio access network has not occurred includes means for recognizing or causing to recognize one or more of: the apparatus not successfully performing inter-system change to GERAN or UTRAN, inter-system change to GERAN or UTRAN failing, or the apparatus identifying a Service Reject message from the network.

Example 6 may include the apparatus of any of examples 1-5 or some other example herein, wherein the timer is shorter than a timer used by the network to supervise a CSFB procedure.

Example 7 may include the apparatus of example 6 or some other example herein, wherein the timer used by the network to supervise a CSFB procedure starts with receipt of a service request message by a Mobile Switching Centre/Visitor Location Register (MSC/VLR) and ends with receipt of a paging response message by the MSC/VLR.

Example 8 may include the apparatus of any of examples 1-7 or some other example herein, wherein the timer is shorter than a timer started by the apparatus for a case of a mobile originating CSFB call.

Example 9 may include the apparatus of any of examples 1-7 or some other example herein, further including means for identifying or causing to identify a value to be used for the timer that is sent from the network.

Example 10 may include the apparatus of example 9 or some other example herein, wherein the value is identified from an Attach Accept message or a Tracking Area Update (TAU) Accept message received during a combined attach or combined tracking area updating procedure, respectively.

Example 11 may include the apparatus of example 9 or some other example herein, further including means for signaling or causing to signal to the network that the apparatus supports receipt of the value to be used for the timer.

Example 12 may include the apparatus of example 11 or some other example herein, wherein the means for signaling or causing to signal include means for sending or causing to send an indication in an Attach Request message or a TAU Request message during a combined attach or combined tracking area updating procedure, respectively.

Example 13 may include the apparatus of example 11 or some other example herein, wherein the means for signaling or causing to signal include means for sending or causing to send an indication in an Extended Service Request message sent in response to a paging for an MT CSFB call.

Example 14 may include the apparatus of example 11 or some other example herein, wherein the means for signaling or causing to signal include means for sending or causing to send an indication of support in a user equipment (UE) network capability information element.

Example 15 may include the apparatus of example 9 or some other example herein, further including means for, if the apparatus does not receive a value to be used for the timer, using or causing to use a default value for the timer.

Example 16 may include the apparatus of example 15 or some other example herein, wherein the default value for the timer is shorter than a value for a timer started by the apparatus for the case of a mobile originating CSFB call.

Example 17 may include the apparatus of any of examples 1-16 or some other example herein wherein the apparatus includes a user equipment or a portion thereof.

Example 18 may include an apparatus, including: means for identifying or causing to identify a service request message sent from a user equipment (UE) in response to a paging for a mobile terminating (MT) circuit-switched (CS) call via CS fallback (FB); means for starting or causing to start a supervision timer; and means for, if the timer expires before identification of a paging response message sent from a radio access network associated with the apparatus, releasing or causing to release the MT CSFB call; wherein the supervision timer is longer than a timer used by the UE to supervise a CSFB procedure.

Example 19 may include the apparatus of example 18 or some other example herein wherein the radio access network includes a GSM/EDGE Radio Access Network (GERAN) or a Universal Terrestrial Radio Access Network (UTRAN).

Example 20 may include the apparatus of any of examples 18, 19 or some other example herein, further including means for signaling or causing to signal a value for the timer to be used by the UE.

Example 21 may include the apparatus of example 20 or some other example herein, wherein the means for signaling or causing to signal a value may include means for signaling or causing to signal the value with an Attach Accept message or a TAU Accept message during a combined attach or combined tracking area updating procedure, respectively.

Example 22 may include the apparatus of example 20 or some other example herein, further including means for identifying or causing to identify an indication that the UE supports receipt of a value to be used for the timer used by the UE.

Example 23 may include the apparatus of example 22 or some other example herein, wherein the means for identifying or causing to identify the indication includes means for identifying or causing to identify an Attach Request message or a TAU Request message during a combined attach or combined tracking area updating procedure, respectively.

Example 24 may include the apparatus of example 22 or some other example herein, wherein the means for identifying or causing to identify the indication includes means for identifying or causing to identify an Extended Service Request message sent in response to a paging for an MT CSFB call.

Example 25 may include the apparatus of example 23 or some other example herein, wherein the means for identifying or causing to identify the indication includes means for identifying or causing to identify a UE network capability information element.

Example 26 may include the apparatus of example 22 or some other example herein, further including means for, if the network does not identify an indication of support with signaling from the UE, using or causing to use a default value for the timer.

Example 27 may include the apparatus of example 26 or some other example herein, wherein the default value for the timer is longer than the value for a timer started by the UE for the case of a mobile originating CSFB call.

Example 28 may include the apparatus of any of examples 18-27 or some other example herein, wherein the apparatus includes an evolved nodeB (eNB) or a portion thereof.

Example 29 is a User Equipment (UE) operating in an E-UTRAN and to support mobile terminating (MT) circuit-switched (CS) calls via CS fallback (FB) procedures, wherein, upon receipt of a paging for an MT CSFB call, the UE sends an Extended Service Request message to the network and starts timer T3417ext-MT, and wherein, if timer T3417ext-MT expires before the UE successfully performs inter-system change to GERAN or UTRAN, or inter-system change to GERAN or UTRAN fails, or the UE receives a Service Reject message from the network, then the UE attempts to select GERAN or UTRAN radio access technology and, if successful, to complete the procedures for establishment of the MT CSFB call.

Example 30 is a UE according to example 29 or some other example herein, wherein the timer T3417ext-MT is to be shorter than the timer Ts14 used by the network to supervise the CSFB procedure, starting with receipt of the Service Request message by the MSC/VLR and ending with receipt of a Paging Response message by the MSC/VLR.

Example 31 is a UE according to example 29 or some other example herein, wherein the timer T3417ext-MT is to be shorter than the timer T3417ext started by the UE for the case of a mobile originating CSFB call.

Example 32 is a UE according to example 29 or some other example herein, wherein the value to be used for timer T3417ext-MT is received with signaling from the network.

Example 33 is a UE according to example 32 or some other example herein, wherein the signaling including the value for timer T3417ext-MT is an Attach Accept message or a Tracking Area Update (TAU) Accept message received during a combined attach or combined tracking area updating procedure, respectively.

Example 34 is a UE according to example 32 or some other example herein, wherein the UE indicates in signaling to the network that it supports receiving the value to be used for timer T3417ext-MT with signaling from the network.

Example 35 is a UE according to example 34 or some other example herein, wherein the UE sends the indication of support in an Attach Request message or a TAU Request message during a combined attach or combined tracking area updating procedure, respectively.

Example 36 is a UE according to example 34 or some other example herein, wherein the UE sends the indication of support in an Extended Service Request message sent in response to a paging for an MT CSFB call.

Example 37 is a UE according to example 35 or some other example herein, wherein the UE sends the indication of support included in a UE network capability information element.

Example 38 is a UE according to example 32 or some other example herein, wherein, if the UE does not receive a value to be used for timer T3417ext-MT with signaling from the network, the UE uses a default value for timer T3417ext-MT.

Example 39 is a UE according to example 38 or some other example herein, wherein the default value for timer T3417ext-MT is shorter than the value for timer T3417ext started by the UE for the case of a mobile originating CSFB call.

Example 40 is a mobile network, comprising an E-UTRAN and at least one of a GERAN or a UTRAN, to support mobile terminating (MT) circuit-switched (CS) calls via CS fallback (FB) procedures, wherein, upon receipt of an Extended Service Request message in response to a paging for an MT CSFB call, the network starts a supervision timer Ts14, wherein, if the timer Ts14 expires before the network receives a Paging Response message via the GERAN or UTRAN the network releases the MT CSFB call, and Ts14 is to be longer than the timer T3417ext-MT to be used by the UE to supervise the CSFB procedure.

Example 41 is a mobile network according to example 40 or some other example herein, wherein the value of timer T3417ext-MT to be used by the UE for MT CSFB calls is provided to the UE via signaling.

Example 42 is a mobile network according to example 41 or some other example herein, wherein the value of timer T3417ext-MT is signaled with an Attach Accept message or a TAU Accept message during a combined attach or combined tracking area updating procedure, respectively.

Example 43 is a mobile network according to example 41 or some other example herein, wherein the network receives an indication that the UE supports receipt of a value to be used for timer T3417ext-MT via signaling from the network.

Example 44 is a mobile network according to example 43 or some other example herein, wherein the network receives the indication with an Attach Request message or a TAU Request message during a combined attach or combined tracking area updating procedure, respectively.

Example 45 is a mobile network according to example 43 or some other example herein, wherein the network receives the indication with an Extended Service Request message sent in response to a paging for an MT CSFB call.

Example 46 is a mobile network according to example 44 or some other example herein, wherein the network receives the indication of support included in a UE network capability information element.

Example 47 is a mobile network according to example 45 or some other example herein, wherein, if the network does not receive an indication of support with signaling from the UE, the network uses a default value for timer Ts14.

Example 48 is a mobile network according to example 47 or some other example herein, wherein the default value for timer Ts14 is longer than the value for timer T3417ext started by the UE for the case of a mobile originating CSFB call.

Example 49 may include a method including: identifying or causing to identify a page for a mobile terminating (MT) circuit-switched fallback (CSFB) call; sending or causing to send a service request message to a network; starting or causing to start a timer for performance of a change to a radio access network; and upon expiry of the timer prior to establishment of the change to the radio access network, initiating or causing to initiate a change to the radio access network and establishing or causing to establish the MT CSFB call.

Example 50 may include the method of example 49 or some other example herein, wherein the service request message is an Extended Service Request message.

Example 51 may include the method of examples 49, 50 or some other example herein, wherein the radio access network includes a GSM/EDGE Radio Access Network (GERAN) or a Universal Terrestrial Radio Access Network (UTRAN).

Example 52 may include the method of any of examples 49-51 or some other example herein, further including recognizing or causing to recognize that the establishment of the change to the radio access network has not occurred.

Example 53 may include the method of example 52 or some other example herein, wherein recognizing or causing to recognize that the establishment of the change to the radio access network has not occurred includes recognizing or causing to recognize one or more of: the unsuccessful performance of inter-system change to GERAN or UTRAN, failure of inter-system change to GERAN or UTRAN, or the identification of a Service Reject message from the network.

Example 54 may include the method of any of examples 49-53 or some other example herein, wherein the timer is shorter than a timer used by the network to supervise a CSFB procedure.

Example 55 may include the method of example 54 or some other example herein, wherein the timer used by the network to supervise a CSFB procedure starts with receipt of a service request message by a Mobile Switching Centre/Visitor Location Register (MSC/VLR) and ends with receipt of a paging response message by the MSC/VLR.

Example 56 may include the method of any of examples 49-55 or some other example herein, wherein the timer is shorter than a timer started for a case of a mobile originating CSFB call.

Example 57 may include the method of any of examples 49-55 or some other example herein, further including identifying or causing to identify a value to be used for the timer that is sent from the network.

Example 58 may include the method of example 57 or some other example herein, wherein the value is identified from an Attach Accept message or a Tracking Area Update (TAU) Accept message received during a combined attach or combined tracking area updating procedure, respectively.

Example 59 may include the method of example 58 or some other example herein, further including signaling or causing to signal to the network that an apparatus implementing the method supports receipt of the value to be used for the timer.

Example 60 may include the method of example 59 or some other example herein, wherein the signaling or causing to signal includes sending or causing to send an indication in an Attach Request message or a TAU Request message during a combined attach or combined tracking area updating procedure, respectively.

Example 61 may include the method of example 59 or some other example herein, wherein the signaling or causing to signal includes sending or causing to send an indication in an Extended Service Request message sent in response to a paging for an MT CSFB call.

Example 62 may include the method of example 59 or some other example herein, wherein the signaling or causing to signal includes sending or causing to send an indication of support in a user equipment (UE) network capability information element.

Example 63 may include the method of example 57 or some other example herein, further including, if an apparatus implementing the method does not receive a value to be used for the timer, using or causing to use a default value for the timer.

Example 64 may include the method of example 63 or some other example herein, wherein the default value for the timer is shorter than a value for a timer started by the apparatus implementing the method for the case of a mobile originating CSFB call.

Example 65 may include the method of any of examples 49-64 or some other example herein wherein the method is performed by a user equipment or a portion thereof.

Example 66 may include a method, including: identifying or causing to identify a service request message sent from a user equipment (UE) in response to a paging for a mobile terminating (MT) circuit-switched (CS) call via CS fallback (FB); starting or causing to start a supervision timer; and if the timer expires before identification of a paging response message sent from a radio access network associated with the method, releasing or causing to release the MT CSFB call; wherein the supervision timer is longer than a timer used by the UE to supervise a CSFB procedure.

Example 67 may include the method of example 66 or some other example herein, wherein the radio access network includes a GSM/EDGE Radio Access Network (GERAN) or a Universal Terrestrial Radio Access Network (UTRAN).

Example 68 may include the method of any of examples 66, 67 or some other example herein, further including signaling or causing to signal a value for the timer to be used by the UE.

Example 69 may include the method of example 68 or some other example herein, wherein the signaling or causing to signal a value includes signaling or causing to signal the value with an Attach Accept message or a TAU Accept message during a combined attach or combined tracking area updating procedure, respectively.

Example 70 may include the method of example 68 or some other example herein, further including identifying or causing to identify an indication that the UE supports receipt of a value to be used for the timer used by the UE.

Example 71 may include the method of example 70 or some other example herein, wherein the identifying or causing to identify the indication includes identifying or causing to identify an Attach Request message or a TAU Request message during a combined attach or combined tracking area updating procedure, respectively.

Example 72 may include the method of example 70 or some other example herein, wherein the identifying or causing to identify the indication includes identifying or causing to identify an Extended Service Request message sent in response to a paging for an MT CSFB call.

Example 73 may include the method of example 71 or some other example herein, wherein the identifying or causing to identify the indication includes identifying or causing to identify a UE network capability information element.

Example 74 may include the method of example 70 or some other example herein, further including, if the network does not identify an indication of support with signaling from the UE, using or causing to use a default value for the timer.

Example 75 may include the method of example 74 or some other example herein, wherein the default value for the timer is longer than the value for a timer started by the UE for the case of a mobile originating CSFB call.

Example 76 may include the method of any of examples 66-75 or some other example herein wherein the method is performed by an evolved NodeB (eNB) or a portion thereof.

Example 77 may include an apparatus to: identify a request for a mobile terminating (MT) circuit-switched fallback (CSFB) call; transmit a service request message to a network; initiate a timer for performance of a change to a radio access network; and upon expiry of the timer prior to establishment of the change to the radio access network, initiate a change to the radio access network and start the MT CSFB call.

Example 78 may include the apparatus of example 77 or some other example herein, wherein the service request message is an Extended Service Request message.

Example 79 may include the apparatus of examples 77, 78 or some other example herein, wherein the radio access network includes a GSM/EDGE Radio Access Network (GERAN) or a Universal Terrestrial Radio Access Network (UTRAN).

Example 80 may include the apparatus of any of examples 77-79 or some other example herein, and further to recognize that the establishment of the change to the radio access network has not occurred.

Example 81 may include the apparatus of example 80 or some other example herein, wherein recognize that the establishment of the change to the radio access network has not occurred includes recognize one or more of: the apparatus not successfully performing inter-system change to GERAN or UTRAN, inter-system change to GERAN or UTRAN failing, or the apparatus identifying a Service Reject message from the network.

Example 82 may include the apparatus of any of examples 77-81 or some other example herein, wherein the timer is shorter than a timer used by the network to supervise a CSFB procedure.

Example 83 may include the apparatus of example 82 or some other example herein, wherein the timer used by the network to supervise a CSFB procedure starts with receipt of a service request message by a Mobile Switching Centre/Visitor Location Register (MSC/VLR) and ends with receipt of a paging response message by the MSC/VLR.

Example 84 may include the apparatus of any of examples 77-83 or some other example herein, wherein the timer is shorter than a timer started by the apparatus for a case of a mobile originating CSFB call.

Example 85 may include the apparatus of any of examples 77-83 or some other example herein, and further to identify a value to be used for the timer that is sent from the network.

Example 86 may include the apparatus of example 85 or some other example herein, wherein the value is identified from an Attach Accept message or a Tracking Area Update (TAU) Accept message received during a combined attach or combined tracking area updating procedure, respectively.

Example 87 may include the apparatus of example 86 or some other example herein, and further to signal to the network that the apparatus supports receipt of the value to be used for the timer.

Example 88 may include the apparatus of example 87 or some other example herein, wherein the signal includes transmit an indication in an Attach Request message or a TAU Request message during a combined attach or combined tracking area updating procedure, respectively.

Example 89 may include the apparatus of example 87 or some other example herein, wherein the signal includes transmit an indication in an Extended Service Request message sent in response to a paging for an MT CSFB call.

Example 90 may include the apparatus of example 87 or some other example herein, wherein the signal includes transmit an indication of support in a user equipment (UE) network capability information element.

Example 91 may include the apparatus of example 86 or some other example herein, further to, if the apparatus does not receive a value to be used for the timer, use a default value for the timer.

Example 92 may include the apparatus of example 91 or some other example herein, wherein the default value for the timer is shorter than a value for a timer started by the apparatus for the case of a mobile originating CSFB call.

Example 93 may include the apparatus of any of examples 77-92 or some other example herein, wherein the apparatus includes a user equipment or a portion thereof.

Example 94 may include an apparatus, to: identify a service request message sent from a user equipment (UE) in response to a paging for a mobile terminating (MT) circuit-switched (CS) call via CS fallback (FB); start a supervision timer; and if the timer expires before identification of a paging response message sent from a radio access network associated with the apparatus, end the MT CSFB call; wherein the supervision timer is longer than a timer used by the UE to supervise a CSFB procedure.

Example 95 may include the apparatus of example 94 or some other example herein, wherein the radio access network includes a GSM/EDGE Radio Access Network (GERAN) or a Universal Terrestrial Radio Access Network (UTRAN).

Example 96 may include the apparatus of any of examples 94, 95 or some other example herein, further to signal a value for the timer to be used by the UE.

Example 97 may include the apparatus of example 96 or some other example herein, wherein signal a value includes signal the value with an Attach Accept message or a TAU Accept message during a combined attach or combined tracking area updating procedure, respectively.

Example 98 may include the apparatus of example 96 or some other example herein, further to identify an indication that the UE supports receipt of a value to be used for the timer used by the UE.

Example 99 may include the apparatus of example 98 or some other example herein, wherein identify the indication includes identify an Attach Request message or a TAU Request message during a combined attach or combined tracking area updating procedure, respectively.

Example 100 may include the apparatus of example 98 or some other example herein, wherein identify the indication includes identify an Extended Service Request message sent in response to a paging for an MT CSFB call.

Example 101 may include the apparatus of example 99 or some other example herein, wherein to identify the indication includes identify a UE network capability information element.

Example 102 may include the apparatus of example 98 or some other example herein, further to, if the apparatus network does not identify an indication of support with signaling from the UE, use a default value for the timer.

Example 103 may include the apparatus of example 102 or some other example herein, wherein the default value for the timer is longer than the value for a timer started by the UE for the case of a mobile originating CSFB call.

Example 104 may include the apparatus of any of examples 94-103 or some other example herein wherein the apparatus includes an evolved NodeB (eNB) or a portion thereof.

Example 105: An apparatus for a user equipment (UE), comprising: a data storage device to store a value of an extended service request for mobile terminated services (EXT-MT) timer, the value of the EXT-MT timer being less than a value of a guard timer of a visitor location register (VLR); processing circuitry operably coupled to the data storage device, the processing circuitry to: decode a paging for a mobile terminated circuit-switched fallback (MT CSFB) call received from a mobility management entity (MME) via an evolved NodeB (eNB); generate an extended service request message to be transmitted to the MME via the eNB responsive to the paging for the MT CSFB call; start the EXT-MT timer upon transmission of the extended service request message; and attempt to select a radio access technology of a different type of radio access network (RAN) if the EXT-MT timer expires before the UE successfully performs inter-system change and a circuit-switched (CS) fallback cancellation request was not received from a subscriber.

Example 106: The apparatus of Example 105, wherein: the EXT-MT timer comprises a T3417 extended service request for mobile terminated services (T3417ext-mt) timer; the guard timer of the VLR comprises a Ts14 guard timer; the different type of RAN comprises a Global System for Mobile communications (GSM) Enhanced Data Rates for GSM Evolution (EDGE) RAN (GERAN) or a Universal Mobile Telecommunications Service (UMTS) Terrestrial RAN (UTRAN); and the inter-system change comprises an inter-system change from 51 mode to A/Gb mode or Iu mode.

Example 107: The apparatus according to any one of Examples 105 and 106, wherein the processing circuitry is also configured to attempt to select the radio access technology of the different type of RAN if the inter-system change fails.

Example 108: The apparatus according to any one of Examples 105-107, wherein the processing circuitry is further configured to attempt to perform inter-system change from 51 mode to A/Gb mode or Iu mode if a Service Reject message is received from the eNB.

Example 109: The apparatus according to any one of Examples 105-108, wherein the processing circuitry is configured to complete Mobility Management (MM) and Call Control (CC) procedures for establishment of the MT CSFB call if the attempt to select the radio access technology of the different type of RAN is successful.

Example 110: The apparatus according to any one of Examples 105-109, wherein the value of the EXT-MT timer is four seconds (4 s).

Example 111: The apparatus according to any one of Examples 105-110, wherein the value of the guard timer is configurable between five seconds and twenty seconds (5 s-20 s).

Example 112: The apparatus according to any one of Examples 105-111, wherein upon expiry of the guard timer the VLR is configured to release the MT CSFB call towards a calling party associated with the MT CSFB call.

Example 113: The apparatus according to any one of Examples 105-112; wherein the paging for the MT CSFB call received from the MME via the eNB comprises Non-Access Stratum (NAS) communication.

Example 114: A computer-readable storage medium of a user equipment (UE), the computer-readable storage medium having computer-readable instructions stored thereon, the computer-readable instructions configured to instruct processing circuitry to: decode a paging received from an evolved NodeB (eNB), the paging indicating a mobile terminated circuit-switched fallback (MT CSFB) call; generate an extended service request message indicating acceptance of the MT CSFB call to be sent to the eNB; start a T3417 extended service request for mobile terminated services (T3417ext-mt) timer when the extended service request message is sent; and attempt to select Global System for Mobile communications (GSM) Enhanced Data Rates for GSM Evolution (EDGE) Radio Access Network (RAN) (GERAN) or Universal Mobile Telecommunications Service (UMTS) Terrestrial RAN (UTRAN) radio access technology if the T3417ext-mt timer expires before the UE successfully performs inter-system change from S1 mode to A/Gb mode or Iu mode and a circuit-switched (CS) fallback cancellation request was not received.

Example 115: The computer-readable storage medium of Example 114, wherein the computer-readable instructions are further configured to instruct the processing circuitry to attempt to select GERAN or UTRAN radio access technology if the inter system change from S1 mode to A/Gb mode or Iu mode fails.

Example 116: The computer-readable storage medium according to any one of Examples 114 and 115, wherein the computer-readable instructions are further configured to instruct the processing circuitry to attempt to select GERAN or UTRAN radio access technology if a Service Reject message is received from the eNB.

Example 117: The computer-readable storage medium according to any one of Examples 114-116, wherein the computer-readable instructions are further configured to instruct the processing circuitry to complete Mobility Management (MM) and Call Control (CC) procedures for establishment of the MT CSFB call if the attempt to select GERAN or UTRAN is successful.

Example 118: The computer-readable storage medium according to any one of Examples 114-117, wherein the value of the T3417ext-mt timer is less than a value of a Ts14 guard timer of a visitor location register (VLR).

Example 119: The computer-readable storage medium of Example 118, wherein the value of the Ts14 guard timer is configurable between five seconds and twenty seconds (5 s-20 s).

Example 120: The computer-readable storage medium according to any one of Examples 114-119, wherein the value of the T3417ext-mt timer is four seconds (4 s).

Example 121: An apparatus of a visitor location register (VLR), comprising: a data storage device configured to store a value of a first timer for use in guarding a mobile terminated (MT) user equipment (UE) fallback procedure to Global System for Mobile communications (GSM) Enhanced Data Rates for GSM Evolution (EDGE) Radio Access Network (RAN) (GERAN) or Universal Mobile Telecommunications Service (UMTS) Terrestrial RAN (UTRAN); and one or more processors operably coupled to the data storage device, the one or more processors configured to: generate a paging request to be transmitted to a mobile management entity (MME), the paging request indicating a mobile terminated circuit-switched fallback (MT CSFB) call directed to the UE; decode an SGsAP service request message received from the MME, the SGsAP service request message indicating that the UE accepted the MT CSFB call; start the first timer responsive to receiving the extended service request message; and set up the MT CSFB call directly with the UE responsive to an attempt by the UE to select GERAN or UTRAN after expiration of a second timer on a side of the UE corresponding to an extended service request for mobile terminated services, wherein a value of the first timer is greater than a value of the second timer.

Example 122: The apparatus of Example 121, wherein: the first timer comprises a Ts14 guard timer; and the second timer comprises a T3417 extended service request for termination (T3417ext-mt) timer.

Example 123: The apparatus according to any one of Examples 121 and 122, wherein the value of the first timer is configurable between five seconds and twenty seconds (5 s-20 s).

Example 124: The apparatus of Example 123, wherein a granularity of the first timer is one second (1 s).

Example 125: The apparatus according to any one of Examples 121-124, wherein the one or more processors are configured to release the MT CSFB call towards a calling party associated with the MT CSFB call responsive to expiry of the first timer.

Example 126: The apparatus according to any one of Examples 121-125, wherein the value of the second timer is four seconds (4 s).

Example 127: The apparatus according to any one of Examples 121-126, wherein the one or more processors are further configured to set up the MT CSFB call directly with the UE responsive to an attempt by the UE to select GERAN or UTRAN following failure of an inter-system change, by the UE, from S1 mode to A/Gb mode or Iu mode.

Example 128: The apparatus according to any one of Examples 121-127, wherein the one or more processors are further configured to set up the MT CSFB call directly with the UE responsive to an attempt by the UE to select GERAN or UTRAN following receipt, by the UE, of a Service Reject message rejecting an inter-system change from S1 mode to A/Gb mode or Iu mode.

Example 129: A method of operating a user equipment (UE), the method comprising: storing, on a data storage device, a value of an extended service request for mobile terminated services (EXT-MT) timer, the value of the EXT-MT timer being less than a value of a guard timer of a visitor location register (VLR); decoding a paging for a mobile terminated circuit-switched fallback (MT CSFB) call received from a mobility management entity (MME) via an evolved NodeB (eNB); generating an extended service request message to be transmitted to the MME via the eNB responsive to the paging for the MT CSFB call; starting the EXT-MT timer upon transmission of the extended service request message; and attempting to select a radio access technology of a different type of radio access network (RAN) if the EXT-MT timer expires before the UE successfully performs inter-system change and a circuit-switched (CS) fallback cancellation request was not received from a subscriber.

Example 130: The method of Example 129, wherein: the EXT-MT timer comprises a T3417 extended service request for mobile terminated services (T3417ext-mt) timer; the guard timer of the VLR comprises a Ts14 guard timer; the different type of RAN comprises a Global System for Mobile communications (GSM) Enhanced Data Rates for GSM Evolution (EDGE) RAN (GERAN) or a Universal Mobile Telecommunications Service (UMTS) Terrestrial RAN (UTRAN); and the inter-system change comprises an inter-system change from S1 mode to A/Gb mode or Iu mode.

Example 131: The method according to any one of Examples 129 and 130, further comprising attempting to select the radio access technology of the different type of RAN if the inter system change fails.

Example 132: The method according to any one of Examples 129-131, further comprising attempting to perform inter-system change from S1 mode to A/Gb mode or Iu mode if a Service Reject message is received from the eNB.

Example 133: The method according to any one of Examples 129-132, further comprising completing Mobility Management (MM) and Call Control (CC) procedures for establishment of the MT CSFB call if the attempt to select the radio access technology of the different type of RAN is successful.

Example 134: The method according to any one of Examples 129-133, wherein the value of the EXT-MT timer is four seconds (4 s).

Example 135: The method according to any one of Examples 129-134, wherein the value of the guard timer is configurable between five seconds and twenty seconds (5 s-20 s).

Example 136: The method according to any one of Examples 129-135, further comprising releasing, by the VLR, the MT CSFB call towards a calling party associated with the MT CSFB call upon expiry of the guard timer.

Example 137: The method according to any one of Examples 129-136, wherein the paging for the MT CSFB call received from the MME via the eNB comprises Non-Access Stratum (NAS) communication.

Example 138: A method of operating a user equipment (UE), the method comprising: decoding a paging received from an evolved NodeB (eNB), the paging indicating a mobile terminated circuit-switched fallback (MT CSFB) call; generating an extended service request message indicating acceptance of the MT CSFB call to be sent to the eNB; starting a T3417 extended service request for mobile terminated services (T3417ext-mt) timer when the extended service request message is sent; and attempting to select Global System for Mobile communications (GSM) Enhanced Data Rates for GSM Evolution (EDGE) Radio Access Network (RAN) (GERAN) or Universal Mobile Telecommunications Service (UMTS) Terrestrial RAN (UTRAN) radio access technology if the T3417ext-mt timer expires before the UE successfully performs inter-system change from S1 mode to A/Gb mode or Iu mode and a circuit-switched (CS) fallback cancellation request was not received.

Example 139: The method of Example 138, further comprising selecting GERAN or UTRAN radio access technology if the inter-system change from S1 mode to A/Gb mode or Iu mode fails.

Example 140: The method according to any one of Examples 138 and 139, further comprising attempting to select GERAN or UTRAN radio access technology if a Service Reject message is received from the eNB.

Example 141: The method according to any one of Examples 138-140, further configured comprising completing Mobility Management (MM) and Call Control (CC) procedures for establishment of the MT CSFB call if the attempt to select GERAN or UTRAN is successful.

Example 142: The method according to any one of Examples 138-141, wherein the value of the T3417ext-mt timer is less than a value of a Ts14 guard timer of a visitor location register (VLR).

Example 143: The method of Example 142, wherein the value of the Ts14 guard timer is configurable between five seconds and twenty seconds (5 s-20 s).

Example 144: The method according to any one of Examples 138-143, wherein the value of the T3417ext-mt timer is four seconds (4 s).

Example 145: A method of operating a visitor location register (VLR), the method comprising: storing a value of a first timer for use in guarding a mobile terminated (MT) user equipment (UE) fallback procedure to Global System for Mobile communications (GSM) Enhanced Data Rates for GSM Evolution (EDGE) Radio Access Network (RAN) (GERAN) or Universal Mobile Telecommunications Service (UMTS) Terrestrial RAN (UTRAN); generating a paging request to be transmitted to a mobile management entity (MME), the paging request indicating a mobile terminated circuit-switched fallback (MT CSFB) call directed to the UE; decoding an SGsAP service request message received from the MME, the SGsAP service request indicating that the UE accepted the MT CSFB call; starting the first timer responsive to receiving the extended service request message; and setting up the MT CSFB call directly with the UE responsive to an attempt by the UE to select GERAN or UTRAN after expiration of a second timer on a side of the UE corresponding to an extended service request for mobile terminated services, wherein a value of the first timer is greater than a value of the second timer.

Example 146: The method of Example 145, wherein: the first timer comprises a Ts14 guard timer; and the second timer comprises a T3417 extended service request for termination (T3417ext-mt) timer.

Example 147: The method according to any one of Examples 145 and 146, wherein the value of the first timer is configurable between five seconds and twenty seconds (5 s-20 s).

Example 148: The method of Example 147, wherein a granularity of the first timer is one second (1 s).

Example 149: The method according to any one of Examples 145-148, further comprising releasing the MT CSFB call towards a calling party associated with the MT CSFB call responsive to expiry of the first timer.

Example 150: The method according to any one of Examples 145-149, wherein the value of the second timer is four seconds (4 s).

Example 151: The method according to any one of Examples 145-150, further comprising setting up the MT CSFB call directly with the UE responsive to an attempt by the UE to select GERAN or UTRAN following failure of an inter system change, by the UE, from S1 mode to A/Gb mode or Iu mode.

Example 152: The method according to any one of Examples 145-151, further comprising setting up the MT CSFB call directly with the UE responsive to an attempt by the UE to select GERAN or UTRAN following receipt, by the UE, of a Service Reject message rejecting an inter-system change from S1 mode to A/Gb mode or Iu mode.

Example 153: A means for performing at least a portion of the method according to any one of claims 129-152.

Example 154: At least one computer-readable storage medium having computer-readable instructions stored thereon, the computer-readable instructions configured to instruct at least one processor to perform at least a portion of the method according to any one of claims 129-152.

Example 155 may include an apparatus comprising means to perform one or more elements of a method described in or related to any of examples 1-154, or any other method or process described herein.

Example 156 may include one or more non-transitory computer-readable media comprising instructions to cause an electronic device, upon execution of the instructions by one or more processors of the electronic device, to perform one or more elements of a method described in or related to any of examples 1-154, or any other method or process described herein.

Example 157 may include an apparatus comprising logic, modules, or circuitry to perform one or more elements of a method described in or related to any of examples 1-154, or any other method or process described herein.

Example 158 may include a method, technique, or process as described in or related to any of examples 1-154, or portions or parts thereof.

Example 159 may include an apparatus comprising: one or more processors and one or more computer readable media comprising instructions that, when executed by the one or more processors, cause the one or more processors to perform the method, techniques, or process as described in or related to any of examples 1-154, or portions thereof.

Example 160 may include a signal as described in or related to any of examples 1-154, or portions or parts thereof.

Example 161 may include a signal in a wireless network as shown and described herein.

Example 162 may include a method of communicating in a wireless network as shown and described herein.

Example 163 may include a system for providing wireless communication as shown and described herein.

Example 164 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It will be apparent to those having skill in the art that many changes may be made to the details of the above-described embodiments without departing from the underlying principles of the disclosure. The scope of the present disclosure should, therefore, be determined only by the following claims.

The invention claimed is:

1. An apparatus for a user equipment (UE), comprising:
a data storage device to store a value of an extended service request for mobile terminated services (EXT-MT) timer, the value of the EXT-MT timer being less than a value of a guard timer of a visitor location register (VLR);
processing circuitry operably coupled to the data storage device, the processing circuitry to:
decode a paging for a mobile terminated circuit-switched fallback (MT CSFB) call received from a mobility management entity (MME) via a base station;
generate an extended service request message to be transmitted to the MME via the base station responsive to the paging for the MT CSFB call;
start the EXT-MT timer upon transmission of the extended service request message; and
attempt to select a radio access technology of a different type of radio access network (RAN) if the EXT-MT timer expires before the UE successfully performs inter-system change and a circuit-switched (CS) fallback cancellation request was not received from a subscriber.

2. The apparatus of claim 1, wherein:
the EXT-MT timer comprises a T3417 extended service request for mobile terminated services (T3417ext-mt) timer;
the guard timer of the VLR comprises a Ts14 guard timer;
the different type of RAN comprises a Global System for Mobile communications (GSM) Enhanced Data Rates for GSM Evolution (EDGE) RAN (GERAN) or a Universal Mobile Telecommunications Service (UMTS) Terrestrial RAN (UTRAN); and
the inter-system change comprises an inter-system change from S1 mode to A/Gb mode or Iu mode.

3. The apparatus of claim 1, wherein the processing circuitry is also configured to attempt to select the radio access technology of the different type of RAN if the inter-system change fails.

4. The apparatus of claim 3, wherein the processing circuitry is further configured to attempt to perform inter-system change from S1 mode to A/Gb mode or Iu mode if a Service Reject message is received from the base station.

5. The apparatus of claim 1, wherein the processing circuitry is configured to complete Mobility Management (MM) and Call Control (CC) procedures for establishment of the MT CSFB call if the attempt to select the radio access technology of the different type of RAN is successful.

6. The apparatus of claim 1, wherein the value of the EXT-MT timer is four seconds (4 s).

7. The apparatus of claim 1, wherein the value of the guard timer is configurable between five seconds and twenty seconds (5 s-20 s).

8. The apparatus of claim 1, wherein upon expiry of the guard timer the VLR is configured to release the MT CSFB call towards a calling party associated with the MT CSFB call.

9. The apparatus of claim 1, wherein the paging for the MT CSFB call received from the MME via the base station comprises Non-Access Stratum (NAS) communication.

10. A non-transitory computer-readable storage medium of a user equipment (UE), the computer-readable storage medium having computer-readable instructions stored thereon, the computer-readable instructions configured to instruct processing circuitry to:
decode a paging received from a base station, the paging indicating a mobile terminated circuit-switched fallback (MT CSFB) call;
generate an extended service request message indicating acceptance of the MT CSFB call to be sent to the base station;
start a T3417 extended service request for mobile terminated services (T3417ext-mt) timer when the extended service request message is sent; and
attempt to select Global System for Mobile communications (GSM) Enhanced Data Rates for GSM Evolution (EDGE) Radio Access Network (RAN) (GERAN) or Universal Mobile Telecommunications Service (UMTS) Terrestrial RAN (UTRAN) radio access technology if the T3417ext-mt timer expires before the UE successfully performs inter-system change from S1 mode to A/Gb mode or Iu mode and a circuit-switched (CS) fallback cancellation request was not received.

11. The non-transitory computer-readable storage medium of claim 10, wherein the computer-readable instructions are further configured to instruct the processing circuitry to attempt to select GERAN or UTRAN radio access technology if the inter-system change from 51 mode to A/Gb mode or Iu mode fails.

12. The non-transitory computer-readable storage medium of claim 10, wherein the computer-readable instructions are further configured to instruct the processing circuitry to attempt to select GERAN or UTRAN radio access technology if a Service Reject message is received from the base station.

13. The non-transitory computer-readable storage medium of claim 10, wherein the computer-readable instructions are further configured to instruct the processing circuitry to complete Mobility Management (MM) and Call Control (CC) procedures for establishment of the MT CSFB call if the attempt to select GERAN or UTRAN is successful.

14. The non-transitory computer-readable storage medium of claim 10, wherein the value of the T3417ext-mt timer is less than a value of a Ts14 guard timer of a visitor location register (VLR).

15. The non-transitory computer-readable storage medium of claim 14, wherein the value of the Ts14 guard timer is configurable between five seconds and twenty seconds (5 s-20 s).

16. The non-transitory computer-readable storage medium of claim 10, wherein the value of the T3417ext-mt timer is four seconds (4 s).

17. An apparatus of a visitor location register (VLR), comprising:
a data storage device configured to store a value of a first timer for use in guarding a mobile terminated (MT) user equipment (UE) fallback procedure to Global System for Mobile communications (GSM) Enhanced Data Rates for GSM Evolution (EDGE) Radio Access Network (RAN) (GERAN) or Universal Mobile Telecommunications Service (UMTS) Terrestrial RAN (UTRAN); and
one or more processors operably coupled to the data storage device, the one or more processors configured to:
generate a paging request to be transmitted to a mobile management entity (MME), the paging request indicating a mobile terminated circuit-switched fallback (MT CSFB) call directed to the UE;
decode a Short Message Service (SMS) over evolved Gs Application Part (SGsAP) service request message received from the MME, the SGsAP service request message indicating that the UE accepted the MT CSFB call;
start the first timer responsive to receiving the SGsAP service request message; and
set up the MT CSFB call directly with the UE responsive to an attempt by the UE to select GERAN or UTRAN after expiration of a second timer on a side of the UE corresponding to an extended service request for mobile terminated services, wherein a value of the first timer is greater than a value of the second timer.

18. The apparatus of claim 17, wherein:
the first timer comprises a Ts14 guard timer; and
the second timer comprises a T3417 extended service request for termination (T3417ext-mt) timer.

19. The apparatus of claim 17, wherein the value of the first timer is configurable between five seconds and twenty seconds (5 s-20 s).

20. The apparatus of claim 19, wherein a granularity of the first timer is one second (1 s).

21. The apparatus of claim 17, wherein the one or more processors are configured to release the MT CSFB call towards a calling party associated with the MT CSFB call responsive to expiry of the first timer.

22. The apparatus of claim 17, wherein the value of the second timer is four seconds (4 s).

23. The apparatus of claim 17, wherein the one or more processors are further configured to set up the MT CSFB call directly with the UE responsive to an attempt by the UE to select GERAN or UTRAN following failure of an inter-system change, by the UE, from S1 mode to A/Gb mode or Iu mode.

24. The apparatus of claim 17, wherein the one or more processors are further configured to set up the MT CSFB call directly with the UE responsive to an attempt by the UE to select GERAN or UTRAN following receipt, by the UE, of a Service Reject message rejecting an inter-system change from S1 mode to A/Gb mode or Iu mode.

* * * * *